US009989260B2

(12) United States Patent
Hughes et al.

(10) Patent No.: US 9,989,260 B2
(45) Date of Patent: Jun. 5, 2018

(54) STAGED FUEL AND AIR INJECTION IN COMBUSTION SYSTEMS OF GAS TURBINES

(71) Applicant: General Electric Company, Schenectady, NY (US)

(72) Inventors: Michael John Hughes, Pittsburgh, PA (US); Jonathan Dwight Berry, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 345 days.

(21) Appl. No.: 14/978,051

(22) Filed: Dec. 22, 2015

(65) Prior Publication Data

US 2017/0176013 A1   Jun. 22, 2017

(51) Int. Cl.
*F23R 3/34* (2006.01)
*F01D 5/18* (2006.01)
(Continued)

(52) U.S. Cl.
CPC .............. *F23R 3/346* (2013.01); *F01D 5/185* (2013.01); *F01D 9/023* (2013.01); *F02C 3/04* (2013.01); *F02C 7/222* (2013.01); *F23D 11/408* (2013.01); *F23D 11/44* (2013.01); *F23D 14/70* (2013.01); *F23R 3/16* (2013.01); *F23R 3/20* (2013.01);
(Continued)

(58) Field of Classification Search
CPC .. F23R 3/346; F23R 3/34; F23R 3/286; F23R 2900/03043; F23R 3/002; F23R 3/06; F02C 7/222; F01D 5/181; F01D 5/18; F01D 5/186; F01D 5/187; F01D 9/023; F01D 9/065; F01D 9/06
See application file for complete search history.

(56) References Cited

U.S. PATENT DOCUMENTS

| 4,104,874 A | 8/1978 | Caruel et al. |
| 4,214,851 A * | 7/1980 | Tuley ........................ F01D 5/18 |
| | | 415/115 |

(Continued)

OTHER PUBLICATIONS

US 8,019,523, 09/2011, Davis, Jr. et al. (withdrawn)
(Continued)

*Primary Examiner* — William H Rodriguez
(74) *Attorney, Agent, or Firm* — Mark E. Henderson; Ernest G. Cusick; Frank A. Landgraff

(57) ABSTRACT

A gas turbine that includes: a combustor coupled to a turbine that define a working fluid flowpath; a compressor discharge cavity; a staged injection system that includes the forward injector and a staged injector; a stator blade positioned extending across the working fluid flowpath between an inboard sidewall and an outboard sidewall. A one-way continuous coolant flowpath that includes: an intake section that comprises an upstream port connected to the compressor discharge cavity and a downstream port formed through one of the inboard and outboard sidewalls; an outtake section that comprises a downstream port connected to the staged injector and an upstream port formed through the other one of the inboard and outboard sidewalls; and a cooling circuit extending through an interior of the airfoil of the stator blade and connecting to the downstream port of the intake section and the upstream port of the outtake section.

19 Claims, 22 Drawing Sheets

(51) Int. Cl.
*F02C 3/04* (2006.01)
*F02C 7/22* (2006.01)
*F23R 3/16* (2006.01)
*F01D 9/02* (2006.01)
*F23R 3/20* (2006.01)
*F23D 11/40* (2006.01)
*F23D 11/44* (2006.01)
*F23D 14/70* (2006.01)
*F02C 3/14* (2006.01)
*F02C 7/224* (2006.01)

(52) U.S. Cl.
CPC ............... *F23R 3/34* (2013.01); *F02C 3/14* (2013.01); *F02C 7/224* (2013.01); *F05D 2220/32* (2013.01); *F05D 2240/35* (2013.01); *F05D 2260/201* (2013.01); *F05D 2260/232* (2013.01); *F05D 2260/601* (2013.01); *F23D 2206/10* (2013.01); *F23R 2900/03043* (2013.01); *F23R 2900/03044* (2013.01); *F23R 2900/03045* (2013.01); *F23R 2900/03341* (2013.01)

(56) References Cited

U.S. PATENT DOCUMENTS

| | | | |
|---|---|---|---|
| 4,628,694 A | 12/1986 | Kelm et al. | |
| 5,174,105 A * | 12/1992 | Hines | F02C 3/10 60/774 |
| 5,199,255 A * | 4/1993 | Sun | B01D 53/56 60/772 |
| 5,207,064 A | 5/1993 | Ciokajlo et al. | |
| 5,253,976 A * | 10/1993 | Cunha | F01D 5/182 415/114 |
| 5,640,840 A * | 6/1997 | Briesch | F01K 21/047 60/39.55 |
| 6,065,282 A * | 5/2000 | Fukue | F02C 7/185 415/115 |
| 6,099,244 A * | 8/2000 | Tomita | F01D 5/18 415/115 |
| 6,142,730 A * | 11/2000 | Tomita | F01D 5/187 415/114 |
| 6,775,987 B2 | 8/2004 | Sprouse et al. | |
| 7,198,483 B2 | 4/2007 | Bueche et al. | |
| 7,244,104 B2 | 7/2007 | Girgis et al. | |
| 7,500,824 B2 | 3/2009 | Cheng et al. | |
| 7,603,863 B2 | 10/2009 | Widener et al. | |
| 7,757,491 B2 | 7/2010 | Hessler | |
| 7,966,822 B2 | 6/2011 | Myers et al. | |
| 8,407,892 B2 | 4/2013 | DiCintio et al. | |
| 8,479,518 B1 * | 7/2013 | Chen | F23R 3/002 60/733 |
| 8,919,137 B2 | 12/2014 | DiCintio et al. | |
| 2004/0040309 A1 | 3/2004 | Ziegner | |
| 2005/0022535 A1 * | 2/2005 | Palmisano | F01D 25/12 60/772 |
| 2005/0169746 A1 * | 8/2005 | Fuller | F01D 5/186 415/115 |
| 2007/0234733 A1 | 10/2007 | Harris et al. | |
| 2008/0264033 A1 | 10/2008 | Lacy et al. | |
| 2010/0170219 A1 | 7/2010 | Venkataraman et al. | |
| 2010/0170251 A1 | 7/2010 | Davis, Jr. et al. | |
| 2013/0174569 A1 * | 7/2013 | Stoia | F23R 3/002 60/776 |
| 2013/0298560 A1 * | 11/2013 | Melton | F23R 3/346 60/733 |
| 2014/0116053 A1 * | 5/2014 | Chen | F23R 3/045 60/737 |
| 2014/0260258 A1 * | 9/2014 | Melton | F23R 3/26 60/733 |
| 2014/0260264 A1 * | 9/2014 | Stoia | F02C 6/08 60/734 |
| 2014/0260269 A1 | 9/2014 | David, Jr. et al. | |
| 2014/0260270 A1 | 9/2014 | Graham et al. | |
| 2014/0260279 A1 * | 9/2014 | DiCintio | F23R 3/005 60/752 |
| 2014/0260303 A1 | 9/2014 | Davis, Jr. et al. | |
| 2015/0030432 A1 * | 1/2015 | Smith | B23P 6/002 415/115 |
| 2016/0245182 A1 * | 8/2016 | Elwasila | F02C 7/228 |
| 2017/0138595 A1 | 5/2017 | Berry et al. | |
| 2017/0175634 A1 * | 6/2017 | Hughes | F02C 7/222 |
| 2017/0175635 A1 * | 6/2017 | Hughes | F02C 7/222 |
| 2017/0175636 A1 * | 6/2017 | Hughes | F02C 3/04 |
| 2017/0175637 A1 | 6/2017 | Hughes et al. | |
| 2017/0176013 A1 * | 6/2017 | Hughes | F23R 3/346 |
| 2017/0176014 A1 * | 6/2017 | Hughes | F23R 3/346 |
| 2017/0191668 A1 | 7/2017 | Hughes et al. | |
| 2017/0211416 A1 * | 7/2017 | Weaver | F01D 5/18 |
| 2017/0268785 A1 * | 9/2017 | Crawley | F01D 9/041 |

OTHER PUBLICATIONS

Extended European Search Report and Opinion issued in connection with corresponding EP Application No. 16203707.1 dated May 16, 2017.

* cited by examiner

STAGED FUEL AND AIR INJECTION IN COMBUSTION SYSTEMS OF GAS TURBINES

BACKGROUND OF THE INVENTION

This present application relates generally to combustion systems within combustion or gas turbine engines. More specifically, but not by way of limitation, the present application describes novel systems, apparatus, and/or methods related to the downstream or axially staged injection of air and fuel in such combustion systems, as well as the cooling systems and components related therewith.

As will be appreciated, the efficiency of combustion or gas turbine engines ("gas turbines") has improved significantly over the past several decades as advanced technologies have enabled increases in engine size and higher operating temperatures. The technical advances that have allowed such achievements include new heat transfer technologies for cooling hot gas path components as well as new more durable materials. During this time frame, however, regulatory standards have been enacted that limit the emission levels of certain pollutants. Specifically, the emission levels of NOx, CO and UHC—all of which are sensitive to the operating temperature and combustion characteristics of the engine—have become more strictly regulated. Of these, the emission level of NOx is especially sensitive to increases at higher engine firing temperatures and, thus, this pollutant has become a significant limit as to how much further firing temperatures might be increased. Because higher operating temperatures generally yield more efficient engines, this hindered further advances in efficiency. Thus, performance limitations associated with conventional combustion systems became factor limiting the development of more efficient gas turbines.

One way in which the combustion system exit temperatures have been increased, while still also maintaining acceptable emission levels and cooling requirements, is through the axially staging the fuel and air injection. This typically requires increasing air volume passing through the combustor as well as directing more of that volume to injectors axially spaced downstream relative to the primary injector positioned at the forward end of the combustor. As will be understood, this increased volume of airflow results in more significance being placed on the aerodynamic performance of the unit. More specifically, combustors that minimize the pressure drop of the compressed air moving through it may achieve performance benefits and efficiencies that, as flow levels through the combustors increase, become of greater significance. Additionally, a significant portion of compressor air is consumed in cooling hot gas path components, such as turbine rotor and stator blades, particularly those in the initial stages of the turbine.

As a result, one of the primary goals of advanced combustion system design relates to developing configurations and cooling strategies that enable higher firing temperatures and/or more efficient performance, while minimizing combustion driven emissions and aerodynamic pressure losses. As will be appreciated, such technological advances would result in improved engine efficiency levels.

BRIEF DESCRIPTION OF THE INVENTION

The present application thus describes a gas turbine that includes: a combustor coupled to a turbine that together define a working fluid flowpath, the working fluid flowpath extending aftward along a longitudinal axis from a forward end defined by a forward injector in the combustor, through an interface at which the combustor connects to the turbine, and then through the turbine to an aftward end defined therein; a compressor discharge cavity formed about the working fluid flowpath for receiving a combustor air supply delivered thereto by a compressor; a staged injection system that includes the forward injector and, axially spaced aftward therefrom along the longitudinal axis of the working fluid flowpath, a staged injector; a stator blade positioned within a row of circumferentially spaced stator blades in the turbine, the stator blade comprising an airfoil extending across the working fluid flowpath between an inboard sidewall and an outboard sidewall; fuel directing structure configured to apportion a combustor fuel supply between the forward injector and the staged injector; and air directing structure for apportioning the combustor air supply between the forward injector and the staged injector. The air directing structure may include a one-way continuous coolant flowpath. The coolant flowpath may include: an intake section that comprises an upstream port that is fluidly coupled to the compressor discharge cavity and a downstream port that is formed through one of the inboard sidewall and the outboard sidewall; an outtake section that comprises a downstream port that is fluidly coupled to the staged injector and an upstream port formed through whichever of the inboard sidewall and the outboard sidewall is the opposite of the one that the downstream port of the intake section is formed through; and a cooling circuit extending through an interior of the airfoil of the stator blade, wherein the cooling circuit comprises an upstream end that connects to the downstream port of the intake section and a downstream end that connects to the upstream port of the outtake section.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
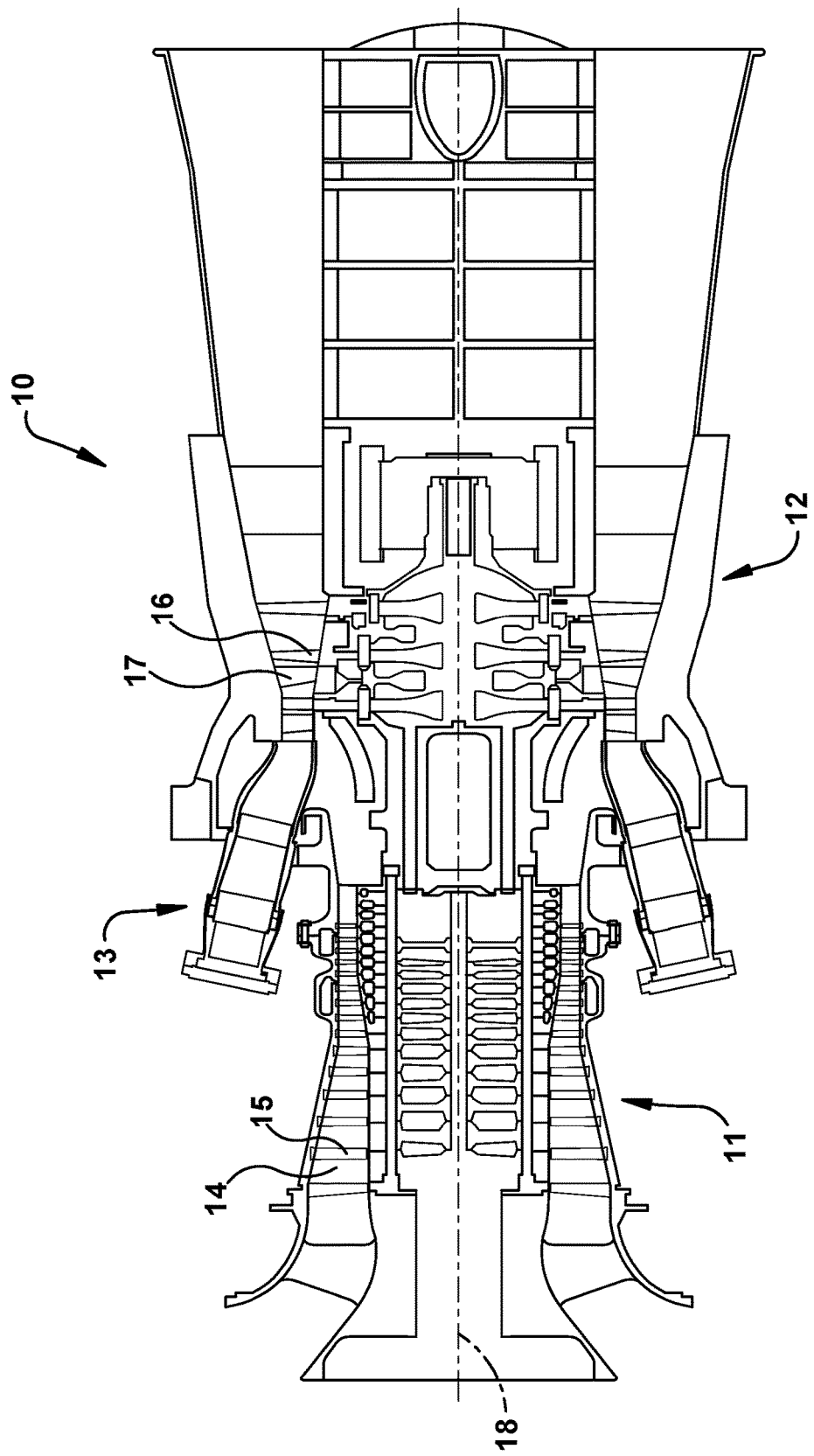
FIG. 1 is a sectional schematic representation of an exemplary gas turbine of a type in which embodiments of the present invention may be used.

Aspects and advantages of the invention are set forth below in the following description, or may be obvious from the description, or may be learned through practice of the invention. Reference will now be made in detail to present embodiments of the invention, one or more examples of which are illustrated in the accompanying drawings. The detailed description uses numerical designations to refer to features in the drawings. Like or similar designations in the drawings and description may be used to refer to like or similar parts of embodiments of the invention. As will be appreciated, each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. It is to be understood that the ranges and limits mentioned herein include all sub-ranges located within the prescribed limits, inclusive of the limits themselves, unless otherwise stated. Additionally, certain terms have been selected to describe the present invention and its component subsystems and parts. To the extent possible, these terms have been chosen based on the terminology common to the technology field. Still, it will be appreciated that such terms often are subject to differing interpretations. For example, what may be referred to herein as a single component, may be referenced elsewhere as consisting of multiple components, or, what may be referenced herein as including multiple components, may be referred to elsewhere as being a single component. As such, in understanding the scope of the present invention, attention should not only be paid to the particular terminology used, but also to the accompanying description and context, as well as the configuration, function, and/or usage of the component being referenced and described, including the manner in which the term relates to the several figures, and, of course, the precise usage of the terminology in the appended claims. Further, while the following examples are presented in relation to a certain type of gas turbine or turbine engine, the technology of the present invention also may be applicable to other types of turbine engines as would the understood by a person of ordinary skill in the relevant technological arts.

Several descriptive terms may be used throughout this application so to explain the functioning of turbine engines and/or the several sub-systems or components included therewithin, and it may prove beneficial to define these terms at the onset of this section. Accordingly, these terms and their definitions, unless stated otherwise, are as follows. The terms "forward" and "aft" or "aftward", without further specificity, refer to the direction toward directions relative to the orientation of the gas turbine. Accordingly, "forward" refers to the compressor end of the engine, while "aftward" refers to the direction toward the turbine end of the engine. Each of these terms, thus, may be used to indicate movement or relative position along the longitudinal central axis of the machine or component therein. The terms "downstream" and "upstream" are used to indicate position within a specified conduit relative to the general direction of flow moving through it. As will be appreciated, these terms reference a direction relative to the direction of flow expected through the specified conduit during normal operation, which should be plainly apparent to those skilled in the art. As such, the term "downstream" refers to the direction in which the fluid is flowing through the specified conduit, while "upstream" refers to the opposite of that. Thus, for example, the primary flow of working fluid through a gas turbine, which begins as air moving through the compressor and then becomes combustion gases within the combustor and beyond, may be described as beginning at an upstream location toward an upstream or forward end of the compressor and terminating at an downstream location toward a downstream or aftward end of the turbine.

In regard to describing the direction of flow within a common type of combustor, as discussed in more detail below, it will be appreciated that compressor discharge air typically enters the combustor through impingement ports that are concentrated toward the aftward end of the combustor (relative to the combustors longitudinal central axis of the combustor and the aforementioned compressor/turbine positioning that defines forward/aft distinctions). Once in the combustor, the compressed air is guided by a flow annulus formed about an interior chamber toward the forward end of the combustor, where the airflow enters the interior chamber and, reversing its direction of flow, travels toward the aftward end of the combustor. In yet another context, the flow of coolant through cooling channels or passages may be treated in the same manner.

Additionally, given the configuration of compressor and turbine about a central common axis, as well as the cylindrical configuration about a central axis that is typical to many combustor types, terms describing position relative to such axes may be used herein. In this regard, it will be appreciated that the term "radial" refers to movement or position perpendicular to an axis. Related to this, it may be required to describe relative distance from the central axis. In this case, for example, if a first component resides closer to the central axis than a second component, the first component will be described as being either "radially inward" or "inboard" of the second component. If, on the other hand, the first component resides further from the central axis than the second component, the first component will be described herein as being either "radially outward" or "outboard" of the second component. Additionally, as will be appreciated, the term "axial" refers to movement or position parallel to an axis, and the term "circumferential" refers to movement or position around an axis. As mentioned, while these terms may be applied in relation to the common central axis that extends through the compressor and turbine sections of the engine, these terms also may be used in relation to other components or sub-systems of the engine as may be appropriate. Finally, the term "rotor blade", without further specificity, is a reference to the rotating blades of either the compressor or the turbine, which include both compressor rotor blades and turbine rotor blades. The term "stator blade", without further specificity, is a reference to the stationary blades of either the compressor or the turbine, which include both compressor stator blades and turbine stator blades. The term "blades" will be used herein to refer to either type of blade. Thus, without further specificity, the term "blades" is inclusive to all type of turbine engine blades, including compressor rotor blades, compressor stator blades, turbine rotor blades, and turbine stator blades.

By way of background, referring now to the figures, FIG. 1 illustrates an exemplary gas turbine 10 in which embodiments of the present application may be used. It will be understood by those skilled in the art that the present invention may not be limited for use in this particular type of turbine engine, and, unless otherwise stated, the examples provided are not meant to be so limiting. In general, gas turbines operate by extracting energy from a pressurized flow of hot gases produced by the combustion of a fuel in a stream of compressed air. As shown, the gas turbine 10 may include an axial compressor 11 that is mechanically coupled via a common shaft or rotor to a downstream turbine section or turbine 12, with a combustor 13 positioned therebetween. As shown, the common shaft of the gas turbine 10 forms a central axis 18 that extends through the compressor 11 and turbine 12.

The compressor 11 may include a plurality of stages, each of which may include a row of compressor rotor blades 14 followed by a row of compressor stator blades 15. Thus, a first stage may include a row of compressor rotor blades 14, which rotates about the central axis 18, followed by a row of compressor stator blades 15, which remains stationary during operation. The turbine 12 also may include a plurality of stages. In the case of the illustrated exemplary turbine 12, a first stage may include a row of nozzles or turbine stator blades 17, which remains stationary during operation, followed by a row of turbine buckets or rotor blades 16, which rotates about the central axis 18 during operation. As will be appreciated, the turbine stator blades 17 within one of the rows generally are circumferentially spaced one from the other and fixed about the axis of rotation. The turbine rotor blades 16 may be mounted on a rotor wheel or disc for rotation about the central axis 18. It will be appreciated that the turbine stator blades 17 and turbine rotor blades 16 lie in the hot gas path of the turbine 12 and interact with the hot gases moving therethrough.

In one example of operation, the rotation of the rotor blades 14 within the axial compressor 11 compresses a flow of air. In the combustor 13, energy is released when the compressed airflow is mixed with a fuel and ignited. The resulting flow of hot combustion gases from the combustor 13, which may be referred to as the working fluid, is then directed over the turbine rotor blades 16, with the flow thereof inducing the rotor blades 16 to rotate about the shaft. In this manner, the energy of the flow of working fluid is transformed into the mechanical energy of the rotating blades and, given the connection between the rotor blades and the shaft via the rotor disc, the rotating shaft. The mechanical energy of the shaft then may be used to drive the rotation of the compressor rotor blades, such that the necessary supply of compressed air is produced, and also, for example, a generator for the production of electricity, as would be the case in a power generating application.

Figure 2:
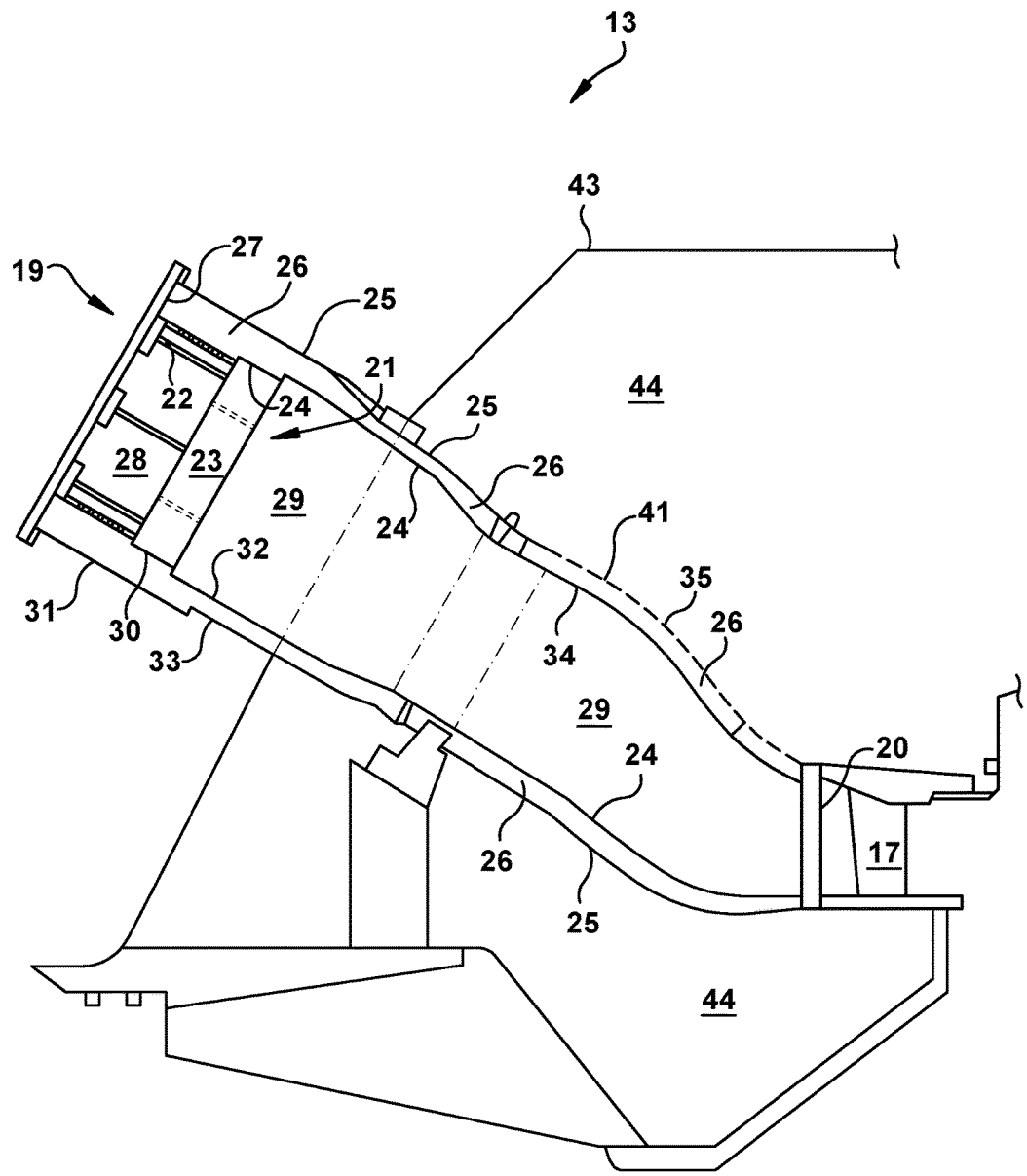
FIG. 2 is a sectional schematic illustration of a conventional combustor and surrounding systems of a type in which embodiments of the present invention may be used.
Figure 3:
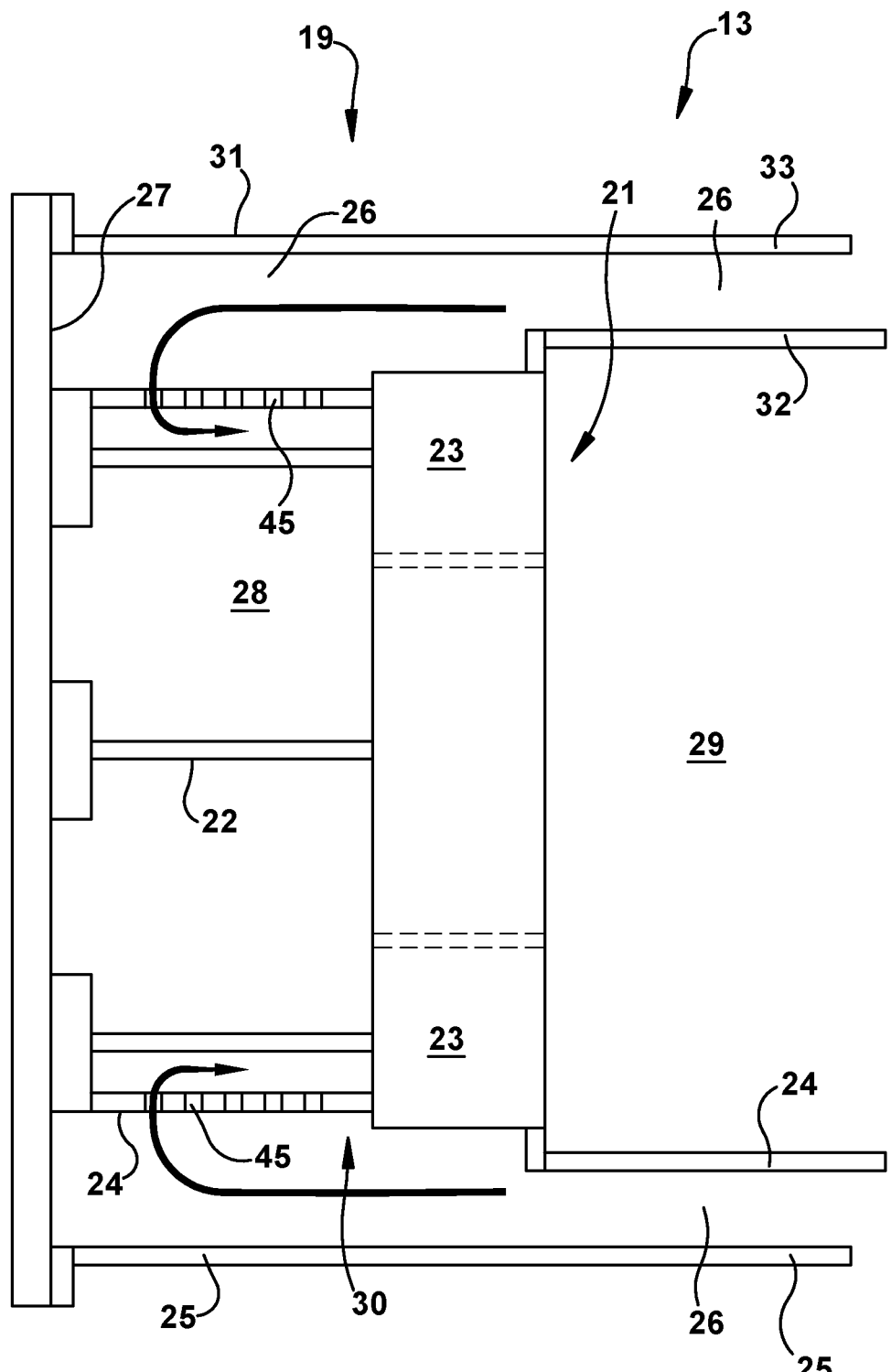
FIG. 3 is an enlarged sectional schematic illustration of the headend region of the combustor of FIG. 2.

FIG. 2 provides a simplified cross-sectional view of a conventional combustor 13 and surrounding structure, while FIG. 3 illustrates a more detailed cross-sectional view of the forward portion of the combustor 13. As will be appreciated, the combustor 13 may be axially defined between a headend 19, which is positioned at the forward end of the combustor 13, and an aft frame 20, which is positioned at the aftward end of the combustor 13 and functions to connect the combustor 13 to the turbine 12. A forward injector 21 may be positioned toward the forward end of the combustor 13. As used herein, the forward injector 21 refers to the forward most fuel and air injector in the combustor 13, which typically serves as the primary component for mixing fuel and air for combustion within the combustion zone of the combustor 13. The forward injector 21 may connect to a fuel line 22 and include a nozzle 23. The nozzle 23 of the forward injector 21 may include any type of conventional nozzle, such as, for example, a micro-mixer nozzle, a nozzle having a swirling or swozzle configuration, or other type of nozzle that meets the functionality discussed herein. More specifically, as discussed in more detail below, the nozzle 23 is configured to be compatible with staged injection systems, as described in U.S. Pat. No. 8,019,523, which is hereby incorporated by reference in its entirety. As illustrated, the headend 19 may provide various manifolds, apparatus, and/or fuel lines 22, through which fuel may be delivered to the forward injector 21. The headend 19, as illustrated, also may include an endcover 27 that, as will be appreciated, forms the forward axial boundary of the large interior cavity that is defined within the combustor 13.

As illustrated, the interior cavity defined within the combustor 13 may be subdivided into several lesser spaces or chambers. These chambers may include airflow or air directing structure (such as walls, ports, and the like) that is configured to direct the flow of compressed air and the fuel/air mixture along a desired flow route. As will be discussed in more detail below, the interior cavity of the combustor 13 may include an inner radial wall 24 and, formed about the inner radial wall 24, an outer radial wall 25. As illustrated, the inner radial wall 24 and outer radial wall 25 may be configured such that a flow annulus 26 is defined therebetween. As further illustrated, at the forward end of the region defined within the inner radial wall 24, a forward chamber 28 may be defined, and, aftward of the forward chamber 28, an aftward chamber 29 may be defined. As will be appreciated, the forward chamber 28 is defined by a section of the inner radial wall 24 that is part of a component called a cap assembly 30. As will be appreciated, the aftward chamber 29 may define the region within which the fuel and air mixture brought together within the forward injector 21 is ignited and combusted, and, thus, may also be referred to as a combustion zone 29. It will be appreciated that, given this arrangement, the forward and aftward chambers 28, 29 may be described as being axially stacked in their configuration. As will be appreciated, unless otherwise specifically limited, the combustor 13 of the present invention may be arranged as an annular combustor or a can-annular combustor.

The cap assembly 30, as shown, may extend aftward from a connection it makes with the endcover 27, and be surrounded generally by an axial section of the outer radial wall 25 that may be referred herein as a combustor casing 31. As will be appreciated, the combustor casing 31 may be formed just outboard of and in spaced relation to the outer surface of the cap assembly 30. In this manner, the cap assembly 30 and the combustor casing 31 may form an axial section of the flow annulus 26 between them. As discussed more below, this section of the flow annulus 26 may be referred to a cap assembly section. As will be appreciated, the cap assembly 30 may further house and structurally support the nozzle 23 of the forward injector 21, which may be positioned at or near the aftward end of the cap assembly 30. Given this configuration, the cap assembly 30 may be described as being sectioned into two smaller, axially stacked regions, with the first of these being a forward region that, as indicated by arrows in FIG. 3, is configured to accept the flow of compressed air from the flow annulus 26. The second region within the cap assembly 30 is an aftward region within which the nozzle 23 is defined.

The aftward chamber or combustion zone 29 that occurs just downstream of the forward injector 21 may be circumferentially defined by an axial section of the inner radial wall 24 that, depending on the type of combustor, may be referred to as a liner 32. From the liner 32, the aftward chamber 29 may extend aftward through a downstream section of the inner radial wall 24 that may be referred to as a transition piece 34. As will be appreciated, this axial section of the inner radial wall 24 directs the flow of hot combustion gases toward the connection that the combustor 13 makes with the turbine 12. Though other configurations are possible, within the transition piece 34 the cross-sectional area of the aftward chamber 29 (i.e., the combustion zone 29) may be configured to smoothly transition from the typically circular shape of the liner 32 to a more annular shape of the transition piece 34 exit, which is necessary for directing the flow of hot gases onto the turbine blades in a desirable manner. As will be appreciated, the liner 32 and the transition piece 34 may be constructed as separately formed components that are joined via some conventional manner, such as mechanical attachment. According to other designs, however, the liner 32 and the transition piece 34 may be formed as an integral component or unibody. Accordingly, unless otherwise stated, reference to the inner radial wall 24 should be understood to encompass either alternative.

The outer radial wall 25, as mentioned, may surround the inner radial wall 24 so that the flow annulus 26 is formed between them. According to exemplary configurations, positioned about the liner 32 section of the inner radial wall 24 is a section of the outer radial wall 25 that may be referred to as a liner sleeve 33. Though other configurations are also possible, the liner 32 and liner sleeve 33 may be cylindrical in shape and arranged concentrically. As illustrated, the section of the flow annulus 26 formed between the cap assembly 30 and the combustor casing 31 may connect to the section of the flow annulus 26 defined between the liner 32 and liner sleeve 33 and, in this way, the flow annulus 26 extends aftward (i.e., toward the connection to the turbine 12). In similar fashion, as illustrated, positioned about the transition piece 34 section of the inner radial wall 24 is a section of the outer radial wall 25 that may be referred to as a transition sleeve 35. As shown, the transition sleeve 35 is configured to surround the transition piece 34 such that the flow annulus 26 is extended further aftward. As will be appreciated, the sections of the flow annulus 26 that are defined by the liner 32/liner sleeve 33 and the transition piece 34/transition sleeve 35 assemblies surround the combustion zone 29. As such, these sections of the flow annulus may be collectively referred to as the combustion zone section.

According to the example provided, it will be appreciated that the flow annulus 26 extends axially between a forward end defined at the endcover 27 of the headend 19 to an aftward end near the aft frame 20. More specifically, it will be appreciated that the inner radial wall 24 and the outer radial wall 25 (as may be defined by each of the cap assembly 30/combustor casing 31, the liner 32/liner sleeve 33, and the transition piece 34/transition sleeve 35 pairings) may be configured such that the flow annulus 26 extends over much of the axial length of the combustor 13. As will be appreciated, like the liner 32 and transition piece 34, the liner sleeve 33 and the transition sleeve 35 may include separately formed components that are connected via some conventional manner, such as mechanical attachment. According to other designs, however, the liner sleeve 33 and the transition sleeve 35 may be formed together as an integral component or unibody. Accordingly, unless otherwise stated, reference to the outer radial wall 25 should be understood to encompass either alternative.

The liner sleeve 33 and/or the transition sleeve 35 may include a plurality of impingement ports 41 that allow compressed air external to the combustor 13 to enter the flow annulus 26. It will be appreciated that, as shown in FIG. 2, a compressor discharge casing 43 may define a compressor discharge cavity 44 about the combustor 13. According to conventional design, the compressor discharge cavity 44 may be configured to receive a supply of compressed air from the compressor 11 such that the compressed air enters the flow annulus 26 through the impingement ports 41. As will be appreciated, the impingement ports 41 may be configured to impinge the airflow entering the combustor 13 so that fast moving jets of air are produced. These jets of air may be trained against the outer surface of the inner radial wall 24—which, as just described, may include the liner 32 and transition piece 34, or an integral unibody—so to convectively cool the inner radial wall 24 during operation. According to conventional design, once in the flow annulus 26, the compressed air is typically directed toward the forward end of the combustor 13, where, via one or more cap inlets 45 formed in the cap assembly 30, the airflow enters the forward region of the cap assembly 30. Once within the cap assembly 30, the compressed air may then be directed to the nozzle 23 of the forward injector 21 where, as mentioned, it is mixed with fuel for combustion within the combustion zone.

Figure 4:
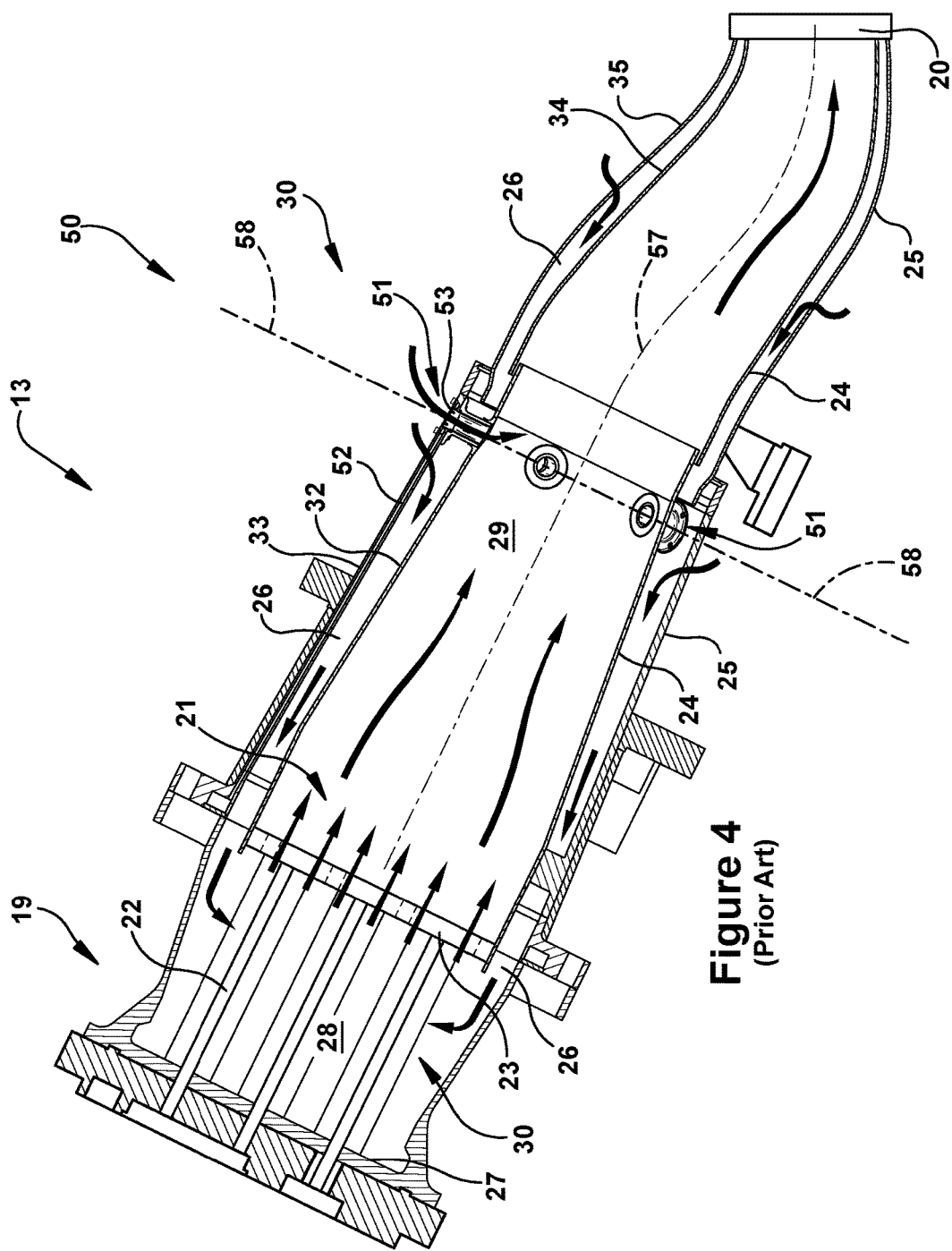
FIG. 4 is a sectional schematic representation of a conventional combustor having a staged injection system of a type in which embodiments of the present invention may be used.

FIG. 4 illustrates a view of a combustor 13 having a staged injection system 50 that enables aftward or downstream injection of fuel and/or air into the combustion zone 29. It will be appreciated that such fuel and air injection systems are commonly referred to as supplemental injection systems, late-lean injection systems, axially staged injection systems, and the like. As used herein, aspects of these types of fuel and air injectors, injection systems, and/or the components associated therewith will be referred to generally, without limitation (except as that provided herein), as "staged injection systems." It further will be appreciated that the staged injection system 50 of FIG. 4 is consistent with an exemplary conventional design and is provided merely for those purposes.

As will be understood, staged injection systems have been developed for the combustors of gas turbines for a number of reasons, including for the reduction of emissions. While emission levels for gas turbines depend upon many criteria, a significant one relates to the temperatures of reactants within the combustion zone, which has been shown to affect certain emission levels, such as NOx, more than others. It will be appreciated that the temperature of the reactants in the combustion zone is proportionally related to the exit temperature of the combustor, which corresponds to higher pressure ratios and improved efficiency levels in such Brayton Cycle type engines. Because it has been found that the emission levels of NOx has a strong and direct relationship to reactant temperatures, modern gas turbines have been able to maintain acceptable NOx emission levels while increasing firing temperatures only through technological advancements such as advanced fuel nozzle design and premixing. Subsequent to those advancements, downstream or staged injection has been employed to enable further increases in firing temperature, as it was found that shorter residence times of the reactants at the higher temperatures within the combustion zone decreased NOx levels.

In operation, as will be appreciated, such staged injection systems typically introduce a portion of the combustor total air and fuel supply downstream of what is typically the primary injection point at the forward end of the combustor. It will be appreciated that such downstream positioning of the injectors decreases the time the combustion reactants remain at the higher temperatures of the flame zone within the combustor. That is to say, shortening the distance reactants travel before exiting the flame zone reduces the time those reactants reside within the highest temperatures within the combustor, which, in turn, reduces the formation of NOx and lowers overall NOx emission levels for the engine. This, for example, has allowed advanced combustor designs that couple fuel/air mixing or pre-mixing technologies with the reduced reactant residence times of downstream injection to achieve further increases in combustor firing temperature and, importantly, more efficient engines, while also maintaining acceptable NOx emission levels. As will be appreciated, there are other considerations limiting the manner in which and the extent to which downstream injection may be done. For example, downstream injection may cause emission levels of CO and UHC to rise. That is, if fuel is injected in too large of quantities at locations that are too far downstream in the combustion zone, it may result in the incomplete combustion of the fuel or insufficient burnout of CO. Accordingly, while the basic principles around the notion of late injection and how it may be used to affect certain emissions may be known generally, design obstacles remain as how this strategy may be best employed so to enable more efficient engines. As these obstacles are overcome, though, and as greater opportunities for diverting larger percentages of fuel and air to downstream or axially staged injectors are realized, more efficient ways for directing the overall mass flows through the combustor may allow for performance advantages relating to reducing the overall pressure drop across the combustor and improving the efficiency and usage of cooling air.

In one exemplary configuration, as shown in FIG. 4, the staged injection system 50 may include a forward injector 21 as well as one or more staged injectors 51. As used herein, staged injectors 51 are injectors axially spaced aftward from the forward injector 21. According to an exemplary arrangement, each of the staged injectors 51 may include a fuel passageway 52 that connects to a nozzle 53. Within the nozzle 53, a fuel/air mixture is created for injection into the downstream portions of the combustion zone. As illustrated, the fuel passageway 52 may be contained within the outer radial wall 25 of the combustor 13, though other apparatus and methods for fuel delivery are also possible. The fuel passageway 52 may extend in a general aftward direction between a connection to a fuel source occurring near the headend 19 and a connection with the nozzles 53 of the staged injectors 51. Though other configurations are also possible for the staged injectors 51 of such systems 50, in the example provided, multiple ones of the staged injectors 51 may be positioned about the periphery of the combustion zone 29. The axial positioning of the staged injectors 51, as shown, may be the approximate aftward end of the liner 32/liner sleeve 33 assembly. Each of the staged injectors 51 may include a nozzle 53. According to the example provided, the nozzle 53 may be configured as a tube that extends across or intersects the flow annulus 26. This tube may be configured to direct a flow therethrough for injection into the combustion zone 29. More specifically, the outboard end of the tube of the nozzle 53 may open to the compressor discharge cavity and/or ports formed that fluidly communicate with the flow annulus 26, and thereby the tube of the nozzle 53 may accept a flow of pressurized air. As discussed more below, the nozzle 53 may further include fuel ports formed through the sides of the tube structure, which may inject fuel into the pressurized air moving through it. In this manner, each of the staged injectors 51 may function to bring together and mix a supply of air and fuel and then inject the resulting mixture into the combustion zone.

As further shown in the example of FIG. 4, the staged injection system 50 may include several of the staged injectors 51 spaced circumferentially about the aftward chamber 29 of the combustor 13. These injectors 51 may be integrated into the liner 32/liner sleeve 32 assembly (or, more generally, the inner radial wall 24/outer radial wall 25 assembly). The staged injectors 51 may be arrayed so that a fuel/air mixture is injected at multiple circumferentially spaced points about the combustion zone. As illustrated, the staged injectors 51 may be positioned at the same or common axial position. That is to say, a plurality of the staged injectors 51 may be located about the approximate same axial position along a longitudinal or central axis 57 of the combustor 13. Having this configuration, the staged injectors 51 may be described as being positioned on a common plane, or, as it will be referred to herein, an injection reference plane 58 as indicated in FIG. 4. As will be appreciated, the staged injectors 51 may be aligned such that the injection reference plane 58 is substantially perpendicular with the central axis 57. In the exemplary configuration shown, the injection reference plane 58 is positioned at the aftward end of the liner 32/liner sleeve 33 assembly.

According to another aspect of the present invention, as will be discussed in more detail below, particular placements of the staged injectors 51 are proposed. In general, the staged injectors 51 may be axially spaced aftward relative to the forward injector 21 so to have a discrete axial position along the working fluid flowpath. This placement of the staged injectors 51 may be defined within an axial range along the central axis 57 of the flowpath. Such placement may be selected according to a desired performance characteristic. Further, as will be provided herein, the axial positioning of the staged injectors 51 may include positions along the aftward chamber 29 of the combustor 13 as well as positions defined within the forward stages of the turbine 12.

Figure 5:
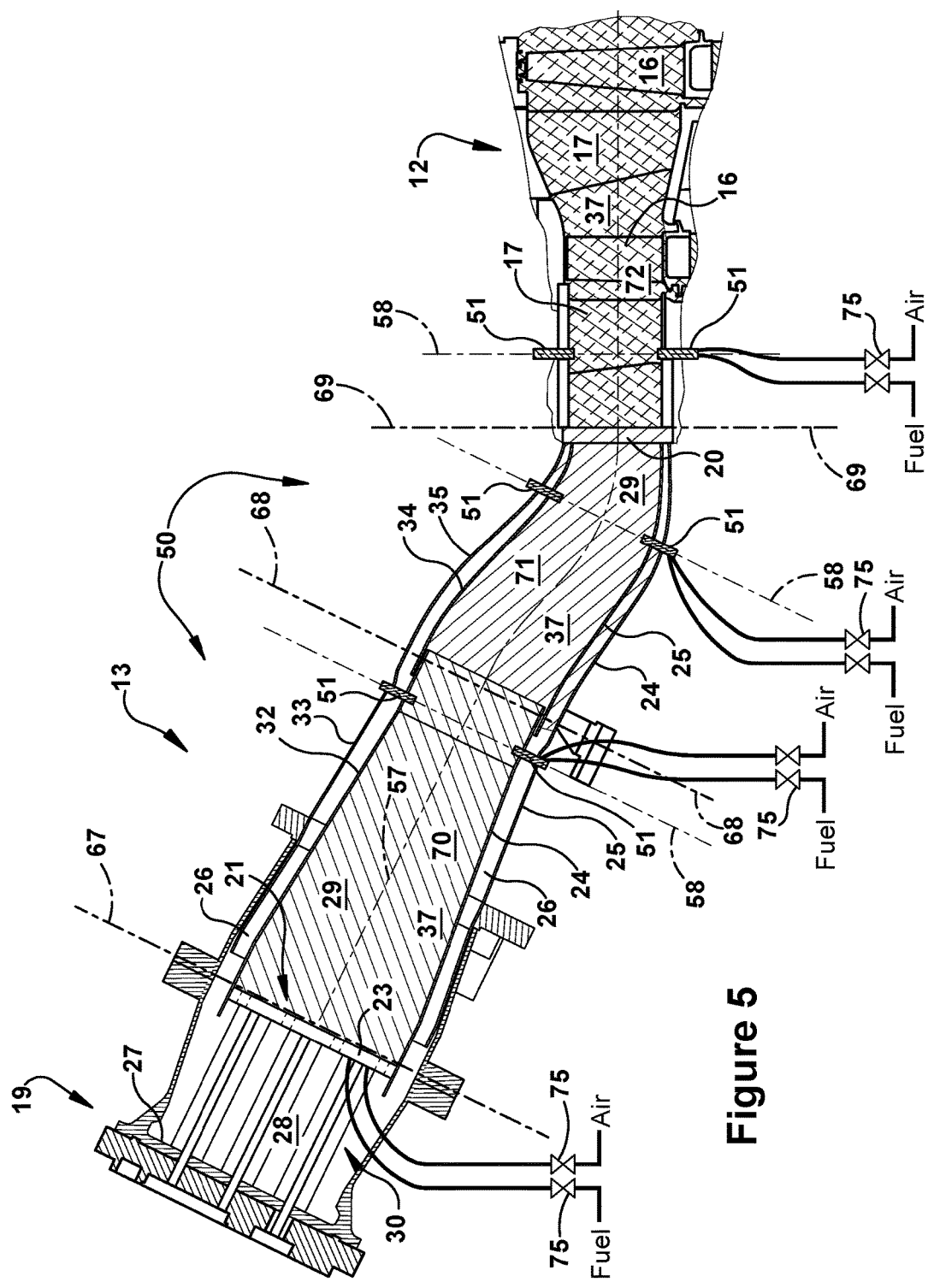
FIG. 5 is a sectional schematic representation of a conventional combustor and upstream stages of a turbine in which embodiments of the present invention may be used.

With reference now to FIG. 5, a cross-sectional view of a combustor 13 and the forward stages of a turbine 12 is provided, and, with reference to the areas delineated therewithin, this illustration will be used to define positioning terminology by which the staged injectors 51 and other related components may be described. Initially, in order to define axial positioning within the combustor 13, it will be appreciated that the combustor 13 and turbine 12 define a working fluid flowpath 37 that extends about a longitudinal central axis 57 from an upstream end defined by the forward injector 21 in the combustor 13 through a downstream end in the turbine 12. Accordingly, the positioning of the staged injectors 51 and other components may be defined in terms of location along this central axis 57 of the working fluid flowpath 37.

As indicated, certain perpendicular reference planes are defined in FIG. 5 so to provide clarity regarding axial positioning within the working fluid flowpath 37. As illustrated, the first of these is a forward reference plane 67 that is defined near the headend 19 of the combustor 13. Specifically, the forward reference plane is disposed at the forward end of the combustion zone 29, i.e., at the boundary between the forward chamber 28 and the aftward chamber 29 defined within the inner wall 24. Another way to describe the positioning of the forward reference plane 67 is that it is approximately located at the downstream end of the nozzle 23 of the forward injector 21 or, alternatively, at the forward end of the working fluid flowpath 37. A second of the reference planes is a mid reference plane 68. The mid reference plane 68 is positioned at the approximate axial midpoint of the aftward chamber 29 of the combustor 13, i.e., about halfway between the nozzle 23 of the forward injector and the downstream end of the combustor 13, which may be the aft frame 20. In cases where the combustor 13 includes the previously described liner 32/transition piece 34 assembly, it will be appreciated that the combustor midplane 68 may occur near the location at which these assemblies connect. A final one of these reference planes is an aftward reference plane 69, which, as illustrated, may be defined at the aftward end of the combustor 13. As will be appreciated, the aftward reference plane 69 marks the far, downstream end of the combustor 13, and, accordingly, as in the example provided, may be defined at the aft frame 20. Additionally, according to these reference planes 67, 68, 69, specific zones within the flowpath of the combustor 13 and the turbine 12 may be designated, which are also indicated on FIG. 5. Accordingly, an upstream combustion zone 70, as indicated, is shown occurring between the forward reference plane 67 and the mid reference plane 68. Second, a downstream combustion zone 71 is shown occurring between the mid reference plane 68 and the aftward reference plane 69. Finally, a turbine combustion zone 72 is the region designated as occurring from the end reference plane 69 through the first stages of blades 16, 17 within the turbine 12. As will be seen, each of these zones 70, 71, 72 is delineated from the other on FIG. 5 by unique crosshatch patterns.

For exemplary purposes, FIG. 5 further provides the possible placement of a stage of the staged injectors 51 within each of the zones 70, 71, 72 described above. As will be appreciated, for the sake of clarity, the staged injectors 51 have been graphically simplified compared to the exemplary one shown in FIG. 4. It should be understood that each of these stages of the staged injectors 51 may be used alone or in concert with one or both of the other stages. As illustrated, a first stage of the staged injectors 51 is shown circumferentially spaced about an injection reference plane 58 positioned within the upstream combustion zone 70. A second stage of the staged injectors 51 is shown circumferentially spaced about a second injection reference plane 58 located within the downstream combustion zone 71. And, finally, a third stage of staged injectors 51 is shown circumferentially spaced about a third injection reference plane 58 within the turbine combustion zone 72. Accordingly, one or more stages of staged injectors 51 may be provided downstream of the forward injector 21.

The staged injectors 51 at any of the aforementioned locations may be conventionally configured for the injecting air, fuel, or both air and fuel, and a plurality may be provided at each axial location such that an array of injectors about an injection reference plane 58 is created. Though graphically simplified in FIG. 5, the staged injectors 51 of the present invention, unless otherwise stated, should be understood to include any type of conventional injector that would be appropriate for the functions described herein as would the interpreted by one of ordinary skill in the relevant technological arts. For example, the staged injectors 51 that may be used in the embodiments of the present invention described below may include the exemplary type provided in FIG. 4. Additionally, the staged injectors may be any injector type described or referenced in U.S. Pat. Nos. 8,019,523 and 7,603,863, both of which are incorporated herein by reference in their entirety. The staged injectors 51 of the present invention may further include those that may be integrated within one of the rows of stator blades 17, in accordance with any conventional means and apparatus, such as, for example, those described in the above-referenced U.S. patents, as well as those described in U.S. Patent Application 2014/0260269, which is also incorporated herein by reference in its entirety. These may include, for example, the fuel/air injectors that are described in U.S. Patent Application 2014/0260269 as being incorporated into the aft frame 20.

For the staged injectors 51 positioned within either the upstream combustion zone 70 or the downstream combustion zone 71, each may be structurally supported by the inner radial wall 24 and/or the outer radial wall 25, and, in some cases, may project into the combustion zones 70, 71, or, like the example of FIG. 4, the staged injector 51 may include a nozzle 53 with an end that resides flush relative to the inner radial wall 24. As will be appreciated, the staged injectors 51 may be configured to inject air and fuel in a direction that is generally transverse to a predominant flow direction through the transition zone. The staged injectors 51 that are located about an injection reference plane 58 may be several in number and positioned at regular intervals about the combustion zone 70, 71 for more uniform distribution of injected fuel/air, though other configurations are also possible. As an example, between 3 and 10 of the staged injectors 51 may be employed at the injection reference plane 58, though more or less may also be used. As described above, the staged injection system 50 may include multiple stages of the staged injectors 51, i.e., multiple staged injectors 51 at multiple axially spaced injection reference planes 58. In such cases, the staged injectors 51 between the two separated stages may be placed in-line or staggered with respect to one another, and the arrangement of one may be configured to supplement the other.

As will be appreciated, according to certain aspects of the present invention, fuel and air may be controllably supplied to the forward injector 21 and each of the staged injectors 51 via any conventional way, including any of those mentioned and described in the patents and patent application incorporated by reference above, as well as U.S. Patent Application 2010/0170219, which is hereby incorporated by reference in its entirety. As schematically illustrated in FIG. 5 with regard to one of the staged injectors 51 within each stage in the defined zones 70, 71, 72, as well as to the forward injector 21, the staged injection system 50 may include control apparatus and related components for actively or passively controlling the delivery of fuel and/or air to each. That is, aspects of the present invention may include control apparatus, methods, systems and configurations for distributing or metering the overall fuel and air supply delivered to the combustor 13 between the staged injectors 51 and/or the forward injector 21. The forward injector 21 and the various staged injectors 51 that may be included in the staged injection system 50 may be controlled and configured in several ways so that desired operation and preferable air and fuel splitting are achieved. As represented schematically in FIG. 5, this may include actively controlling the air and fuel supplies delivered to each via a controllable valve 75, though any mechanically actuated device that functions to meter the relevant flows may also be used. It will be appreciated that active control may be achieved via connecting the controllable valves 75 to a computerized control system in which a controller electronically communicates to each valve and thereby manipulates valve settings pursuant to a control algorithm. According to other possible embodiments, the air and fuel supply to each of the staged injectors 51 as well as to the forward injector 21 may be passively controlled via relative orifice sizing of the fuel and air conduits that supply fuel and air to each.

Control strategies related to the staged injection system 50 may include metering fuel and air supplies between the various staged injectors 51, the various stages (if present) of staged injectors 53, the various staged injectors 51 and the forward injector 21, or each and all. Thus, for example, with reference to the exemplary configuration of FIG. 5 and the various stages of staged injectors 51 depicted therein, according to one possible arrangement, the first stage of staged injectors 51 located about the first injection reference plane 58 may be configured to inject more fuel/air than the second stage of injectors located about the second injection reference plane 58, which may be configured to inject more fuel/air that the third stage of injectors located about the third injection reference plane 58. As will be appreciated, these configurations may be more particularly described using relative percentages. Thus, for example, according to another possible arrangement concerning the metering of fuel between the first, second, and third stages of staged injectors 51, the control configuration may limit the fuel injected at the second stage of staged injectors 51 to less than 50% of the fuel injected at the first stage of staged injectors 51, and the fuel injected at the third stage of staged injectors 51 to less than 50% of the fuel injected at the second stage of injectors. More particularly, according to another exemplary arrangement, for example, the first, second, and third stage of staged injectors 51 may include a control configuration that limits the fuel injected at the second stage of staged injectors 51 to between 10% and 50% of the fuel injected at the first stage of staged injectors 51, and the fuel injected at the third stage of staged injectors 51 to between 10% and 50% of the fuel injected at the first stage of staged injectors 51. Such control strategies, as stated, also may be inclusive of the forward injector 21 such that overall supply of fuel is metered between all of the possible injection points. In such cases, for example, an exemplary control arrangement may prescribe that the forward injector 21 and the first, second, and third stages of staged injectors 51 of the staged injection system 50 be controllably configured such that the following percentages of a total combustor fuel supply are delivered to each during operation: between 40% and 80% delivered to the forward injector 21; between 20% and 40% delivered to the first stage of staged injectors 51; between 2% and 10% delivered to the second stage of staged injectors 51; and between 2% and 10% delivered to the third stage of staged injectors 51. As will be appreciated, the supply of air may be similarly manipulated to each.

Figure 6:
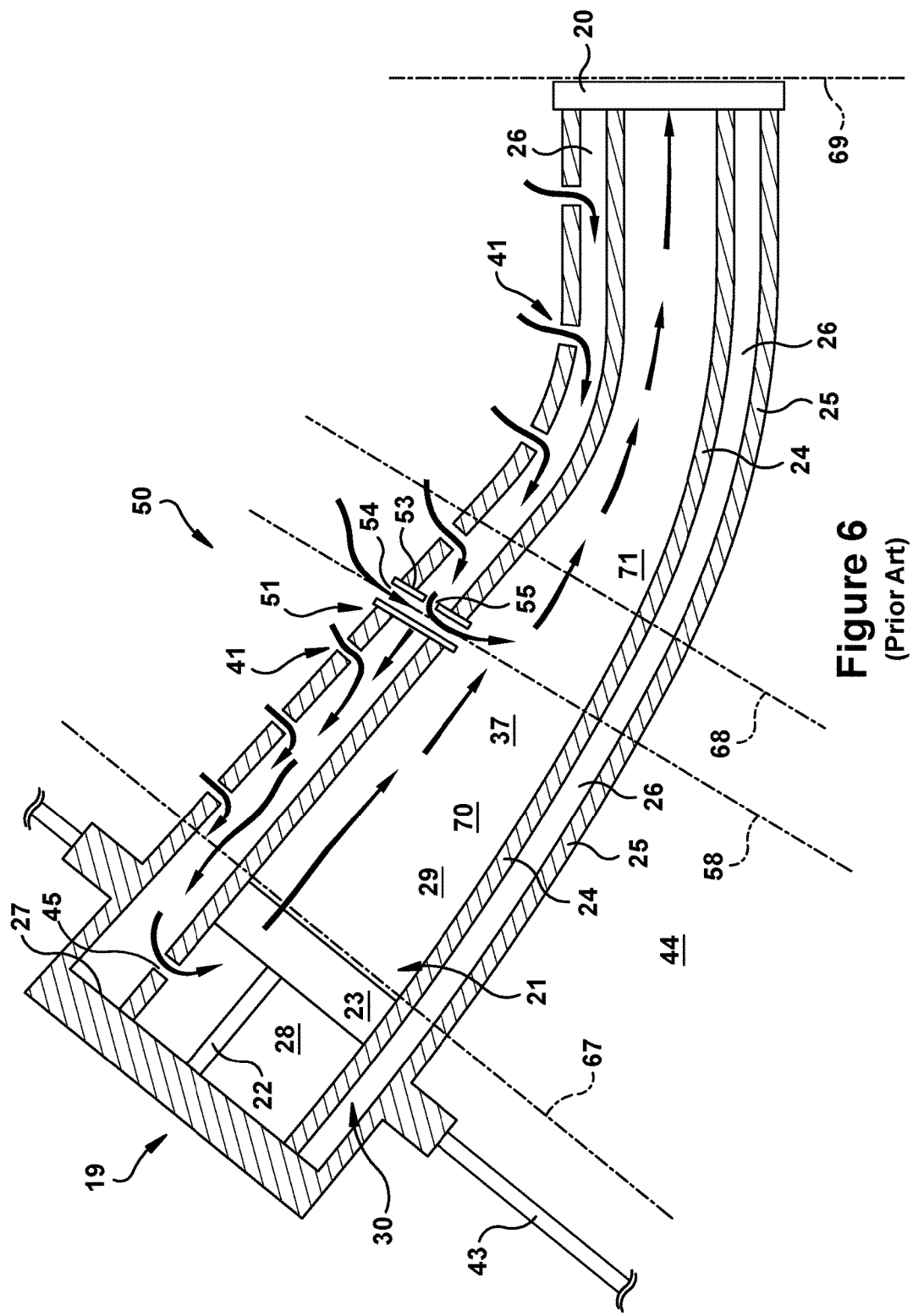
FIG. 6 is a simplified sectional representation of a combustor illustrating a configuration and the induced airflow therethrough according to a conventional design.
Figure 11:
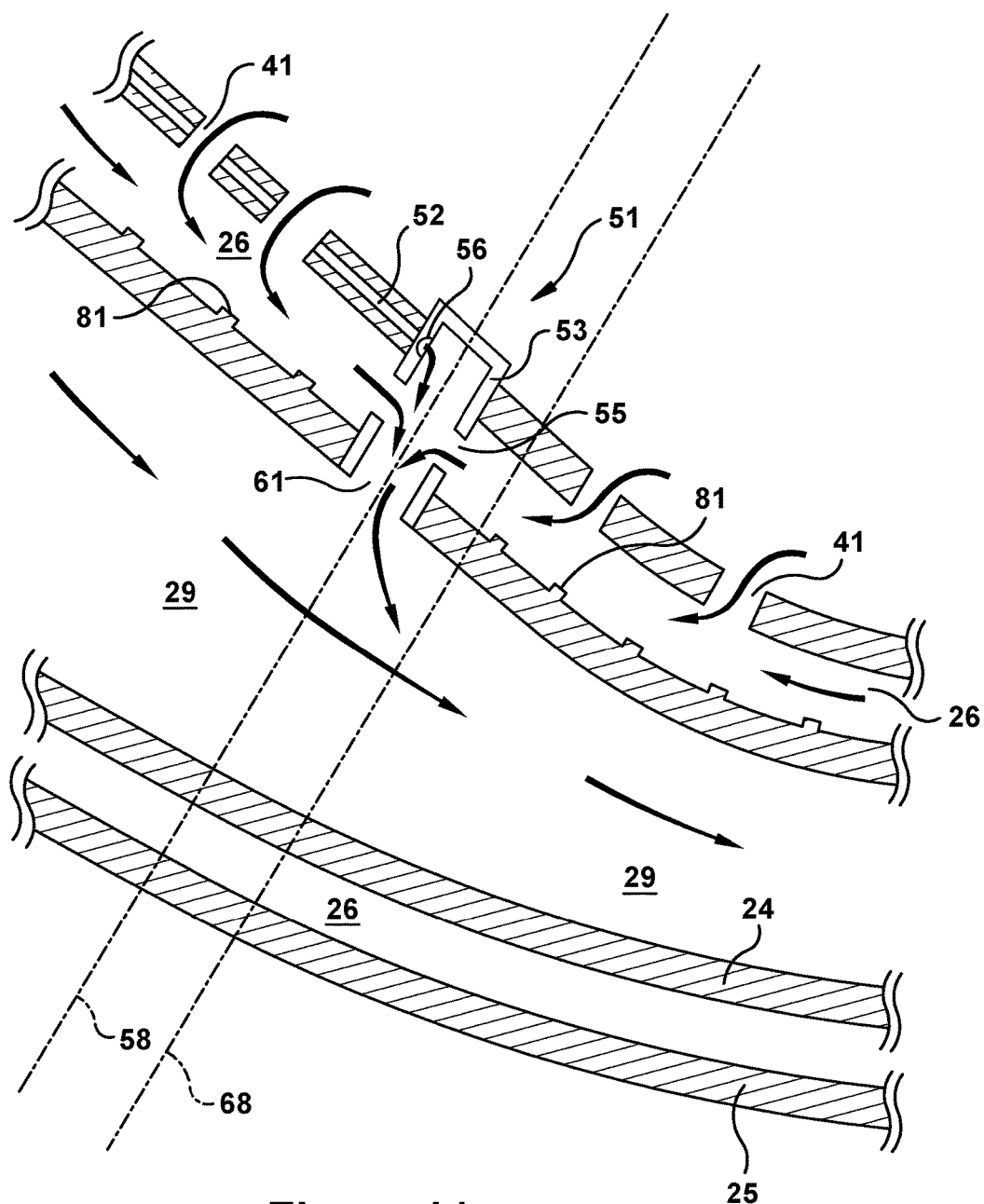
FIG. 11 is an enhanced view of an exemplary configuration of a staged injector and heat transfer structure in the flow annulus according to embodiments of the present invention.
Figure 12:
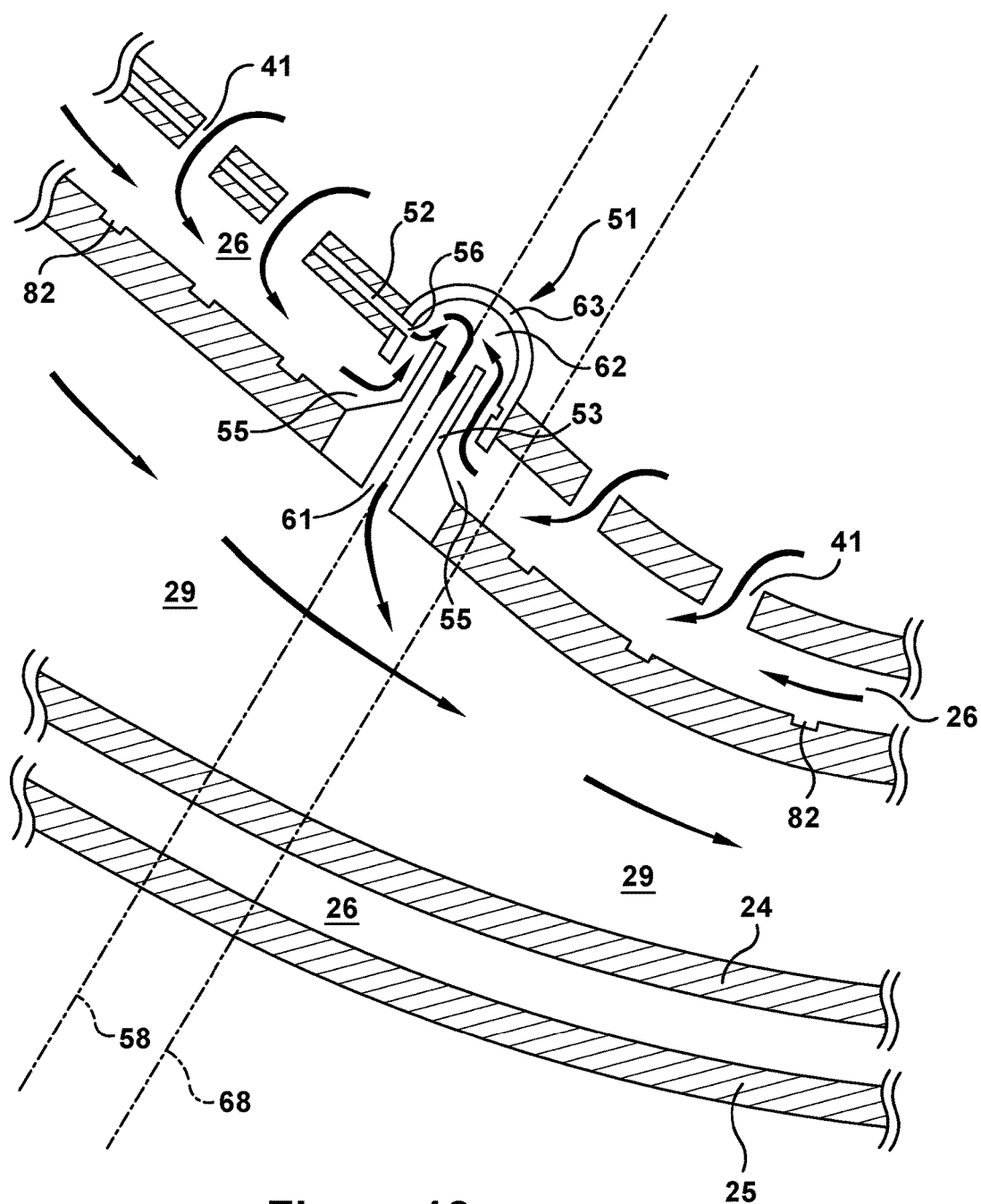
FIG. 12 is an enhanced view of an alternative configuration of a staged injector and heat transfer structure in the flow annulus according to embodiments of the present invention.
Figure 13:
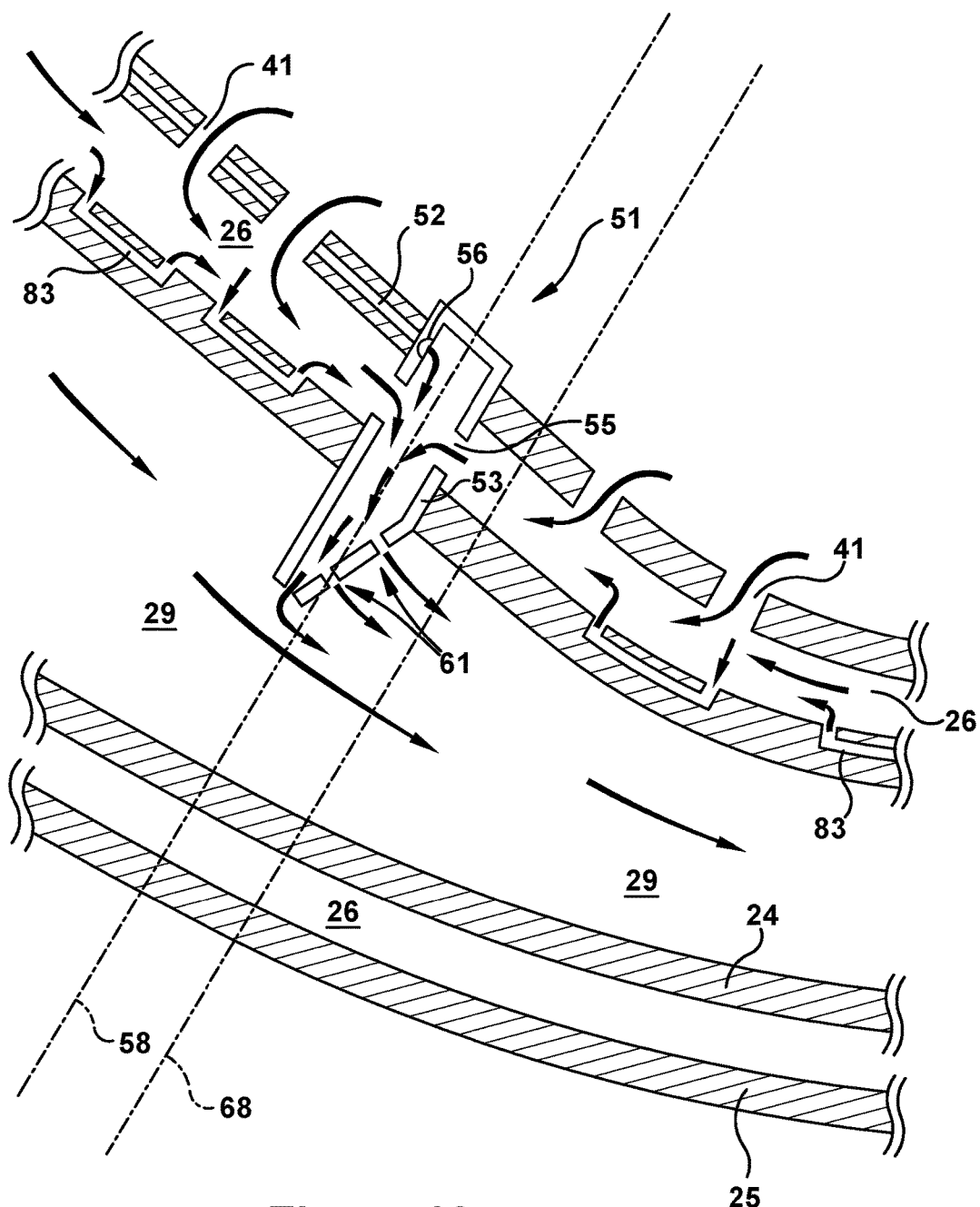
FIG. 13 is an enhanced view of an alternative configuration of a staged injector and heat transfer structure in the flow annulus according to embodiments of the present invention.

FIG. 6 includes a simplified representation of a combustor 13 and staged injection system 50 having a typical airflow pattern that results given the arrangement. For the sake of clarity, the staged injection system 50 is shown as having a single staged injector 51. As will be appreciate, other such staged injectors 51 may be provided about the circumference of the combustion zone. For example, these other staged injectors 51 may be arranged about the injection reference plane 58 that is defined through the staged injector 51 that is shown. As illustrated, the staged injector 51 may include a nozzle 53 that extends across the flow annulus 26. The nozzle 53 may accept airflow via an outboard port 54 that fluidly connects the nozzle to the compressor discharge cavity 44, which, as will be appreciated, may surround the outer radial wall 25 of the combustor. Alternatively (or in addition to), the nozzle 53 of the staged injector 51 may accept airflow via one or more lateral ports or ports 55 that are configured to fluidly connect it to the flow annulus 26. The nozzle 53 may further include fuel ports (as shown in FIGS. 11-13) for injecting fuel delivered to it via the fuel passageway 52 into the supply of air that is moving through the interior of the nozzle 53.

According to one exemplary arrangement, the nozzle 53 of the staged injector 51 includes a cylindrical tube that carries the fuel/air brought together within the nozzle 53 across the flow annulus 26 for injection into the combustion zone 29. In this manner, the nozzle 53 provides a conduit for directing a fuel/air mix across the flow annulus 26 where it then may be injected into the flow of hot gases moving through the combustion zone 29 that is defined by the inner radial wall 24. According to other configurations, as illustrated in FIG. 12, the staged injector 51 may include a cover or air shield positioned about the outboard port 54 so to control or limit the entry of air from the compressor discharge cavity 44, while also providing more enclosed volume within which the fuel and air may be brought together and properly mixed before injection. It will be appreciated that such air shields may serve to substantially isolate the staged injector 51 from the compressor discharge cavity 44 that surrounds it.

As indicated by the flow arrows included in FIG. 6, during operation, air from the compressor discharge cavity 44 may enter the flow annulus 26 via the impingement apertures 41 formed through the outer radial wall 25. This flow of impinged air cools the inner radial wall 24 and then is directed in the forward direction to the headend 19 of the combustor 13, at which point it may reverse direction and be channeled toward the forward injector 21. One particular issue that relates to the use of staged injectors 21 is the negative impact they have on the airflow through the flow annulus 26. Specifically, the staged injectors 21 typically include structure, such as the nozzle 23, which necessarily has to intersect the flow annulus 26 and, thus, interrupts or partially blocks flow therethrough. As should be understood, this results in pressure loss and causes a wake to form downstream of the blockage. This wake can detrimentally affect the flow of air into the cap assembly 30 by making it nonuniform, which then may result in a poorly mixed air-fuel within the nozzle 23 of the forward injector 21, which negatively impact combustion and NOx emissions. The wake formed by the staged injectors 51 also may impact the cooling of the inner radial wall 24 just downstream of the staged injector 51. Specifically, the wake may create a "dead zone" of airflow or eddy currents that negatively affect the heat transfer coefficient. Additionally, the crossflow of coolant within the flow annulus 26 negatively impacts the cooling efficiency of fresh coolant arriving through the impingement ports 41 that are located closer to the headend 19. Specifically, the crossflow of spent coolant (i.e., coolant that has already absorbed heat from the inner radial wall 24) that develops in the flow annulus 26 acts to warm the incoming fresher coolant, which decreases its cooling effectiveness. The crossflow also deflects the incoming coolant so that it strikes the inner radial wall 24 at a less steep angle, which further lessons its effectiveness. The mixing of the two flows—i.e., the crossflow of exhausted coolant and the flow of fresh coolant arriving perpendicular to it—incurs further system losses associated with aerodynamic mixing and momentum transfer.

With reference now to FIGS. 7 through 10, schematic sectional representations (which are similar to the one discussed in reference to FIG. 6), are provided to illustrate combustors 13 having exemplary staged injection systems 50 according to exemplary embodiments of the present invention. As will be understood, these examples illustrate combustor configurations as well as the induced airflow patterns that relate to the configurations in accordance with aspects of the present invention. For the sake of clarity, only a single of the staged injectors 51 is shown in each of the figures provided. As will be appreciate, other such staged injectors 51 may be provided about the circumference of the combustion zone 29. For example, these other staged injectors 51 may be arranged about the injection reference plane 58 defined through the staged injector 51 depicted in each. As should be understood, these other injectors 51, when present, may be configured in the same way such that each induces the same illustrated flow pattern within a corresponding region of the flow annulus 26. In this manner, the exemplary flow patterns depicted in each could be induced about the entire circumference of the flow annulus 26. Further, it should be appreciated that the staged injector 51 may be configured as an annular staged injector that itself extends about the circumference of the flow annulus 26. It should be understood that any of these alternatives are applicable in the same way to the exemplary embodiments subsequently in FIGS. 11 through 22.

It should be noted that, as used herein, "airflow pattern" is the manner in which the supply of air delivered to a compressor discharge cavity 44 is directed into it and circulated therethrough. As will be appreciated, the exemplary airflow patterns are depicted as they so to satisfy certain performance criteria and objectives, which include: 1) delivering air to both the forward injector 21 and staged injector 51 for desirably combusting the supply of fuel being delivered to each; 2) cooling combustor components by directing sufficient airflows over or through the surfaces thereof, particularly those components that are adjacent to or define the combustion zone; and/or 3) minimizing pressure drop across the combustor so to increase engine efficiency. As should be understood, the airflow patterns illustrated herein may be effectuated via known systems, methods, and apparatus, such as the configuration of channels, ports, partitions, walls, surface features, flow controllers, valves, orifices, outlets, and/or other types of flow directing structure, as well as the relative sizing of such features and location thereof. Such flow directing structure may include all those features presently disclosed, as well as other conventional types as would be appreciated by someone of ordinary skill in the relative arts. As used herein, the term "partition" is meant to cover both walls and sealing structures as well as fluid seals. Additionally, unless otherwise stated, such partitions may seal a passage completely or partially.

As illustrated in the figures provided, a staged injection system 50 according to the present invention may include a forward injector 21 and, axially spaced aftward from the forward injector 21, a staged injector 51. As discussed in relation to FIG. 6, the staged injector 51 may intersect the flow annulus 26 so to attain an injection point within the combustion zone 29 defined by the inner radial wall 24 downstream of the forward injector 21. For descriptive purposes, relative to the axial position of the injection point of the staged injector 51, an aftward annulus section may be defined to the aftward side of the injection point, and a forward annulus section may be defined to the forward side of the injection point. The staged injection system 50, as already described, may include fuel directing structure, such as the fuel line 22, fuel passageway 52, and related components, which together may be configured to apportion a combustor fuel supply between the forward injector 21 and the staged injector 51. The combustor fuel supply, as used herein, may be defined as the total supply of fuel being delivered to the combustor 13 during operation. The staged injection system 50 may further include, as will be discussed in more detail below, air directing structure, which may include any of those structures already described herein as well as any other conventional devices and components. The air directing structure may be configured to apportion a combustor air supply between the forward injector 21 and the staged injector 51 of the staged injection system 50. The combustor air supply, as used herein, may be defined as the total supply of air being delivered to the combustor 13 during operation.

The air directing structure may include axially defined intake sections formed along and through the outer radial wall 25. As illustrated, these intake sections may include one or more ports or openings formed through the outer radial wall 25. These ports and openings may fluidly connect the surrounding compressor discharge cavity 44 to corresponding sections of the flow annulus 26. As will be appreciated, an aftward intake section may be defined through the outer radial wall 25 corresponding to the aftward annulus section, and a forward intake section may be defined through the outer radial wall 25 corresponding to the forward annulus section. As indicated by the airflow arrows, the air directing structure may be configured so to direct air entering through the aftward intake section through the aftward annulus section in a forward direction. In this manner, as indicated in FIGS. 7 through 10, the air entering the flow annulus 26 through the ports positioned aftward of the staged injector 51 may flow in a forward direction for ingestion by the staged injector 51. As further illustrated, the air directing structure may be configured so to direct air entering through the forward intake section through the forward annulus section in an aftward direction. In this manner, air entering the flow annulus 26 through ports positioned forward of the staged injector 51 may flow in an aftward direction for ingestion by the staged injector 51.

Figure 7:
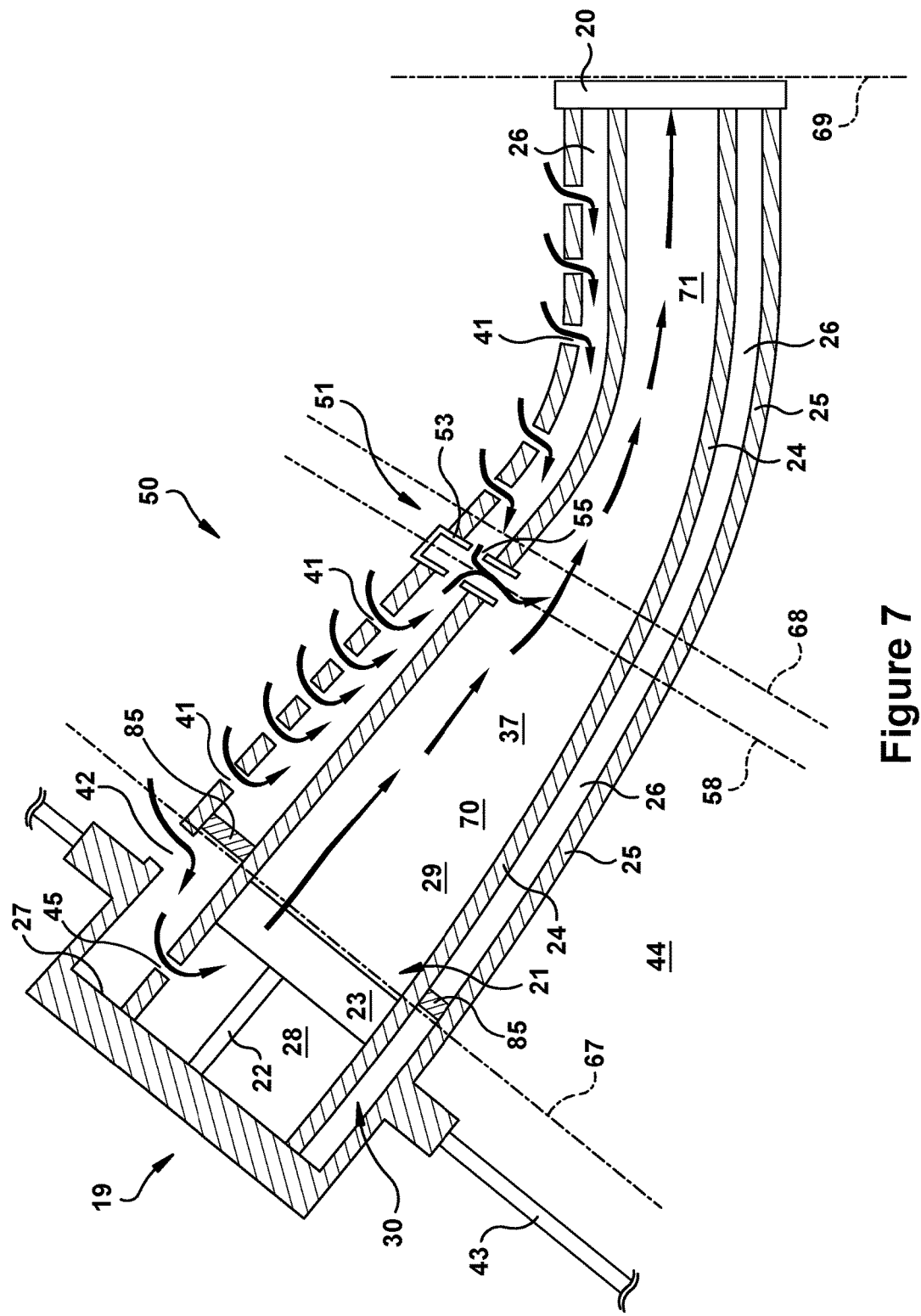
FIG. 7 is a simplified sectional representation of a combustor illustrating a configuration and the induced airflow therethrough according to an exemplary embodiment of the present invention.
Figure 8:
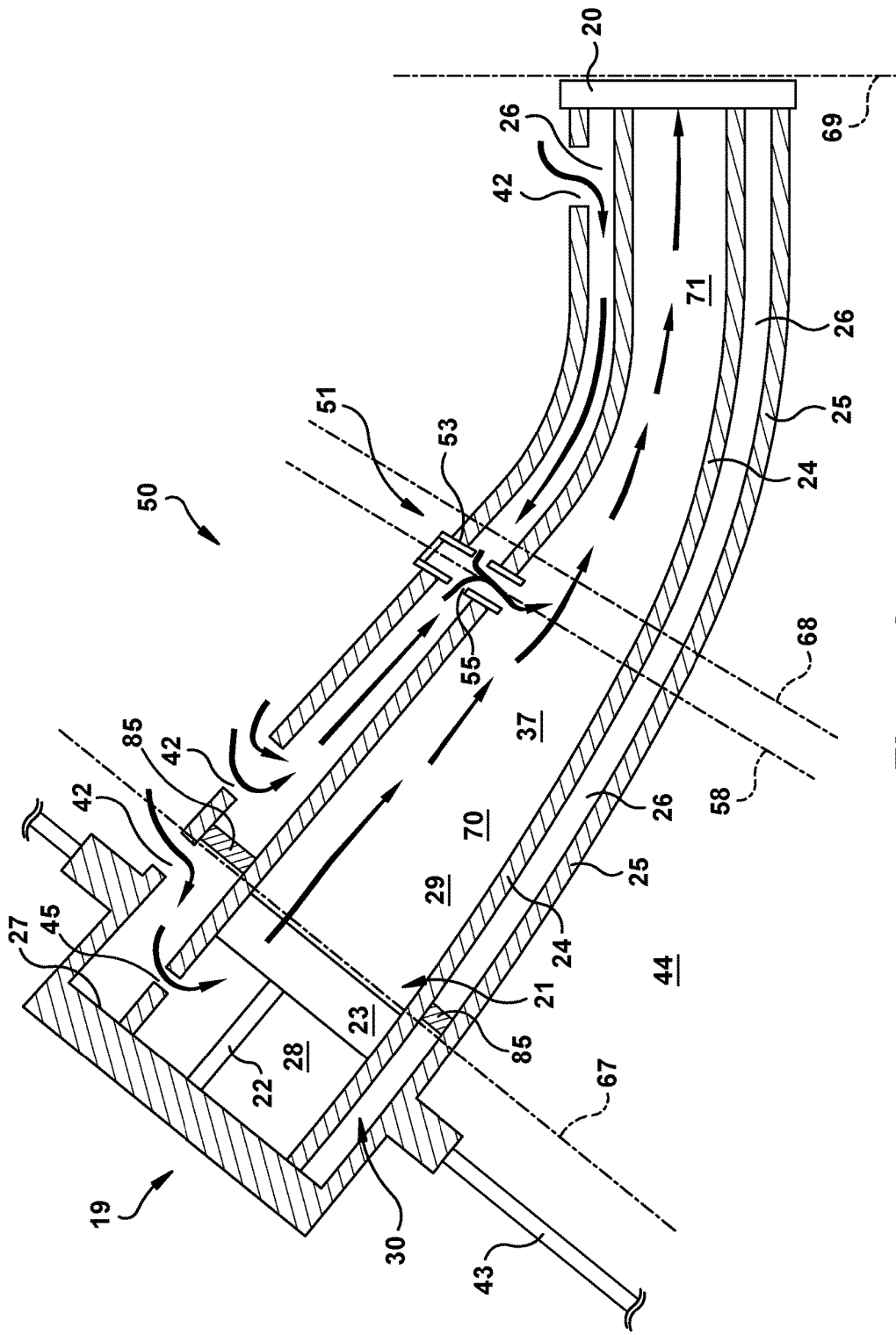
FIG. 8 is a simplified sectional representation of a combustor illustrating a configuration and the induced airflow therethrough according to an alternative embodiment of the present invention.
Figure 9:
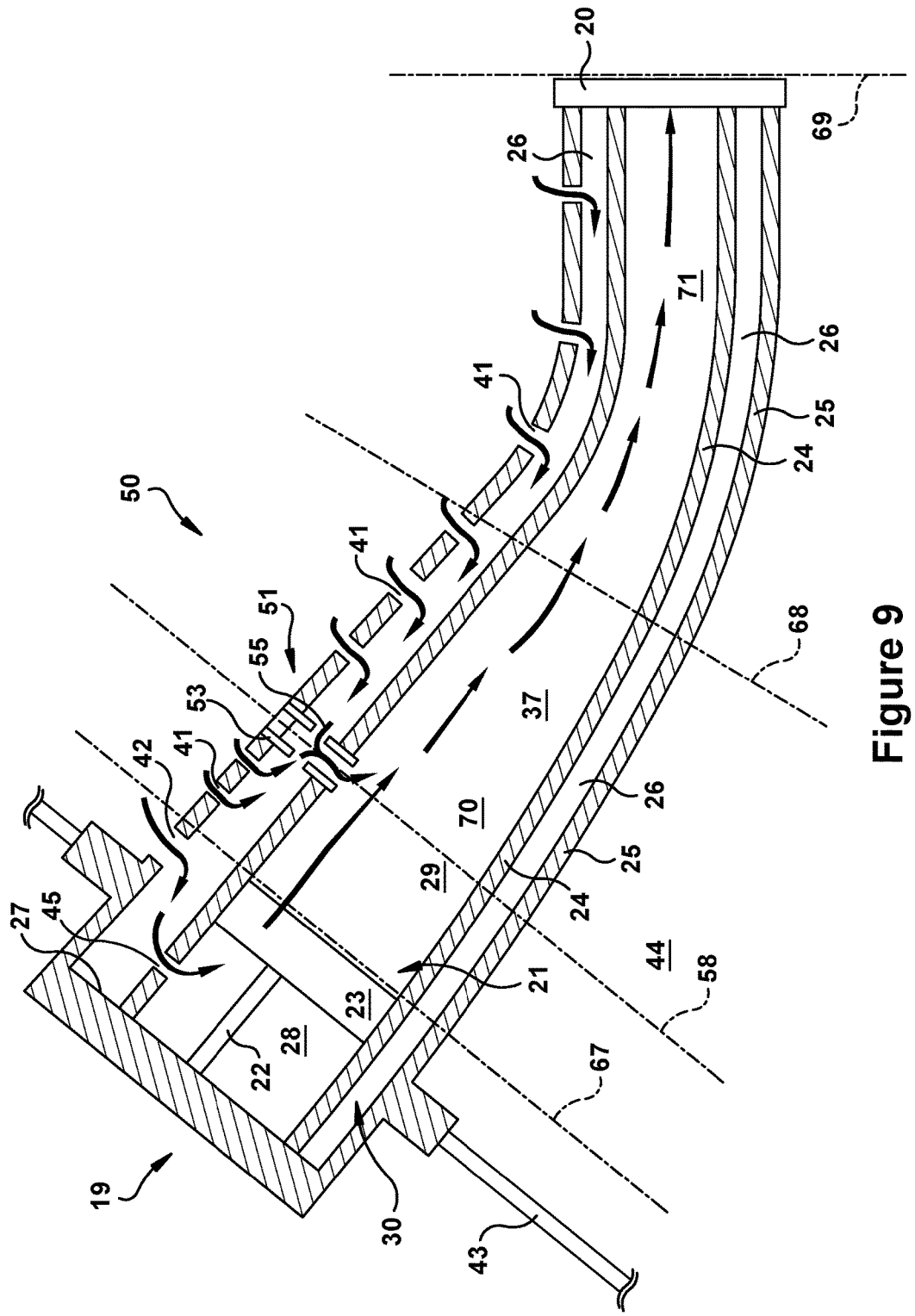
FIG. 9 is a simplified sectional representation of a combustor illustrating a configuration and the induced airflow therethrough according to an alternative embodiment of the present invention.
Figure 10:
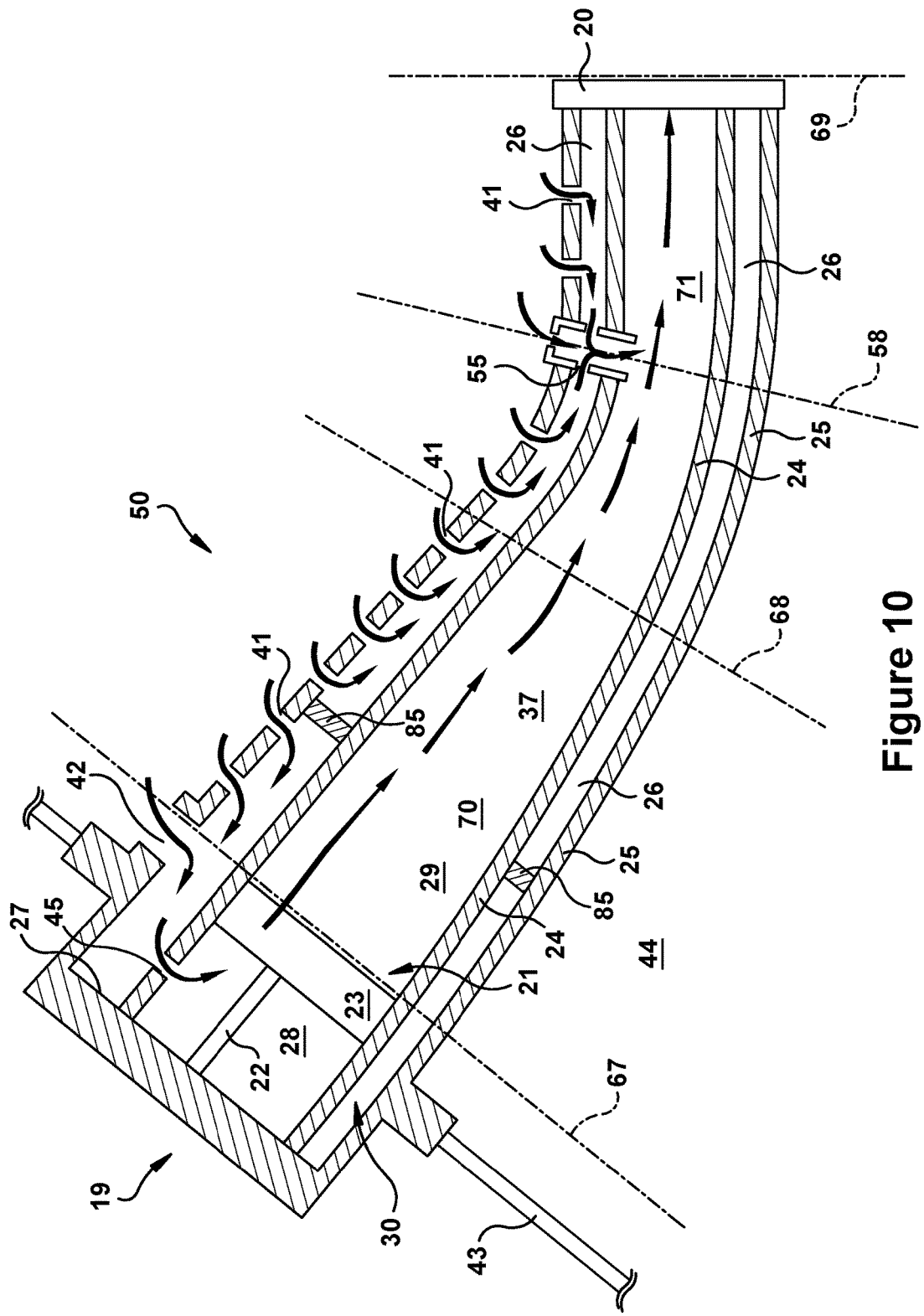
FIG. 10 is a simplified sectional representation of a combustor illustrating a configuration and the induced airflow therethrough according to an alternative embodiment of the present invention.

As defined in relation to FIG. 6, the working fluid flowpath 37 through the combustor 13 may include several reference planes. These include the forward reference plane 67, the mid reference plane 68, and the aftward reference plane 69. Each of these represents a plane that intersects the working fluid flowpath 37 and is aligned substantially perpendicular to the central axis 57 of the working fluid flowpath 37. The forward reference plane 67 may be positioned so to align with the forward end of the combustion zone 29. The mid reference plane 68 may be positioned so to align with the axial midpoint of the combustion zone 29. And, the aftward reference plane 69 may be positioned so to align with the aftward end of the combustion zone. Additionally, the injection reference plane 58 is one that intersects the working fluid flowpath 37 at the position of the staged injector 51. The injection reference plane 58 also may be substantially perpendicular to the central axis 57 of the working fluid flowpath 37 and be positioned so to align with the injection point of the staged injector 51. The injection reference plane 58 may include several of the staged injectors 51 positioned on it, in which case it is a common injector reference plane 58. According certain preferred embodiments, the forward and aftward intake sections may be defined in relation to the reference planes 58, 67, 68, 69. As illustrated in FIG. 7, in accordance with exemplary embodiments, the aftward intake section may include an axial range defined approximately between the injection reference plane 58 and the aftward reference plane 69, while the forward intake section may include an axial range defined approximately between the injection reference plane 58 and the forward reference plane 67. As shown in FIGS. 8 through 10, other configurations are also possible.

As provided in FIGS. 7 through 10, each of the aftward and forward intake sections may include a plurality of spaced impingement ports 41. The aftward and forward intake sections may also include larger ports or openings 42 for allowing greater volumes of air into the flow annulus 26 at particular locations. In the case of impingement ports 41, each may be formed through the outer radial wall 25, and configured to training an impinged jet of air against the outer surface of the inner radial wall 24. In this manner, large sections of the inner radial wall 24 may be adequately cooled via the air supply being ingested by the staged injectors 51. According to preferred embodiments, the plurality of impingement ports 41 of the aftward intake section, for example, may be axially spaced between an aftward most impingement port positioned just forward of the aftward reference plane 69 and a forward most impingement port positioned just aftward of the injection reference plane 58. The plurality of impingement ports 41 of the forward intake section, for example, may be axially spaced between an aftward most impingement port positioned just forward of the injection reference plane 58 and a forward most impingement port positioned just aftward of the forward reference plane 67. Other configurations are also possible. Additionally, the plurality of impingement ports 41 of each of the aftward and forward intake sections may include a multitude in number, such as greater than one hundred. These impingement ports 41 may be circumferentially as well as axially spaced, and may extend about the entirety of the circumference of the outer radial wall 25. As also illustrated, larger ports or openings 42 may be defined through the outer radial wall 25. These may be used to allow larger airflows into the flow annulus 26 at identified locations. In such cases, as will be appreciated, these larger flows may be brought into the flow annulus 26 at a significant distance from the staged injector 51 and allowed to convectively cool the outer surface of the inner radial wall 24 as the large flow travels to the staged injector 51 for ultimate ingestion thereby. Embodiments including both the impingement ports 41 and the larger openings 42 are also possible.

In such staged injection systems 50 of the present invention, the staged injector 51 may be disposed at varying axial positions along the length of the outer radial wall 25/inner radial wall 24 assembly. That is to say, the spacing aftward of the staged injector 51 relative to the forward injector 21 may vary. According to a broad range, the staged injector 51 may be positioned at any location between the forward reference plane 67 and the aftward reference plane 69. According to preferred embodiments, such as the examples of FIGS. 7 and 8, the staged injector 51 may be positioned at or near the mid reference plane 68, i.e., approximately midway between the forward reference plane 67 and the aftward reference plane 69. According to other preferred embodiments, as shown in FIGS. 7, 8, and 9, the staged injector 51 may be positioned between the forward reference plane 67 and the mid reference plane 68. According variance within these particular embodiments, the staged injector 51 may be positioned nearer to the forward reference plane 67 or the mid reference plane 68. As illustrated in FIG. 9, according to one of those particular arrangements, the staged injector 51 is positioned just aftward of the forward reference plane 67. According to another one of those arrangements, the staged injector 51 may be positioned approximately midway between the forward reference plane 67 and the mid reference plane 68. As illustrated in FIG. 10, the staged injector 51 also may be positioned between the mid reference plane 68 and the aftward reference plane 69. This positioning also may include variations, such as examples in which the staged injector 51 is nearer the mid reference plane 68 and others where it is nearer or at the aftward reference plane 69. According to the particular embodiment of FIG. 10, the staged injector 51 may be positioned approximately midway between the mid reference plane 68 and the aftward reference plane 69.

Regardless of positioning, as will be understood, the relative direction of airflow to the staged injector 51 from the intake sections remains consistent in each of the examples of FIGS. 7 through 10. Additionally, in regard to each of these embodiments, the staged injection system 50 may include a plurality of such staged injectors 51. In such cases, as already explained, the staged injectors 51 may be spaced circumferentially such that the injection reference plane 58 is common to each. These additional staged injectors 51, thus, may each accept flow from aftward and forward intake sections that correspond to it. The staged injector 51 also may be configured as an annular injector.

As further illustrated in each of the FIGS. 7 through 10, the air directing structure of the combustor 13 may more specifically described as including a headend intake section that corresponds to the forward injector 21. The headend intake section, as shown, may be positioned forward of the forward intake section. In such cases, the headend intake section may include one of the larger ports or openings 42 formed through the outer radial wall 25, which may be configured to allow an adequate intake of air from the compressor discharge cavity 44 for supplying the forward injector 21. As illustrated, this air may enter the flow annulus 26 and then be directed in the forward direction toward the forward injector 21. That is to say, the headend intake section may be configured to direct air entering through it to the forward injector 21 for combustion with the fuel also being supplied thereto.

For description purposes, as already mentioned, the inner radial wall 24 may be described as including axially stacked chambers in which a forward chamber 28 houses the forward injector 21 and an aftward chamber 29 defines the combustion zone. Furthermore, the staged injector 51 may include structure that extends between the outer radial wall 25 and the inner radial wall 24 and, thereby, blocks a portion of the flow annulus 26. Specifically, this structure, which, for example, may be the tubular nozzle 53, may be said to block a circumferentially defined segment of the flow annulus 26. According to embodiments of the present invention, the nozzle 53 may include ports 55 that fluidly communicate with the flow annulus 26. These ports 55, which, for example, may be laterally formed through the tube of the nozzle 53, may be configured to accept the airflow being directed to the staged injector 51 through the flow annulus 26. In relation to the embodiments of FIGS. 7 and 10, a first port 55 may be disposed on an aftward face of the nozzle 53 and be configured to receive the air flowing to the staged injector via the aftward annulus section. Additionally, a second port 55 may be disposed on a forward face of the nozzle 53 and be configured to receive the air flowing to the staged injector via the forward annulus section. As also mentioned, and as illustrated in FIGS. 11 through 13, the fuel directing structure may include one or more fuel ports 56 formed within the nozzle 53. The fuel ports 56 may connect to a fuel passageway 52 formed outboard of the inner radial wall 24. According to preferred embodiments, the fuel ports 56 may be laterally positioned between an outboard end and an inboard end of the nozzle 53. The fuel directing structure may further include embodiments in which the fuel passageway 52 extends axially through an interior of the outer radial wall 25, as illustrated in FIGS. 11 through 13.

For descriptive purposes, as mentioned, the flow annulus 26 may be described as including a cap assembly section and a combustion zone section. Specifically, the cap assembly section of the flow annulus 26 includes an axial section that occurs about the forward chamber 28 of the inner radial wall 24 (i.e., the cap assembly), while the combustion zone section of the flow annulus 26 includes an axial section that occurs about the aftward chamber 29 of the inner radial wall 24 (i.e., the combustion zone). According to certain preferred embodiments, the opening 42 of the headend intake section is formed through the outer radial wall 25 that corresponds to the cap assembly section of the flow annulus 26. The opening 42 may include a port that is significantly larger in flow area in comparison to the impingement ports 41 that are formed through the outer radial wall 25 corresponding to the combustion zone section of the flow annulus 26. As illustrated in FIGS. 7 through 10, the opening 42 may be configured to fluidly connect the compressor discharge cavity 44 to the cap assembly section of the flow annulus 26. As already discussed, the inner radial wall 24 associated with the cap assembly 30 may include cap inlets 45 for fluidly connecting the cap assembly section of the flow annulus 26 to the interior region of the cap assembly 30, which may be configured to direct air entering through the cap inlets 45 toward the nozzle 23 of the forward injector 21. As will be appreciated, in such cases, the fuel directing structure may include the fuel line 22 that connects the nozzle 23 of the forward injector 21 to a fuel source.

As will be appreciated, the air directing structure of the embodiments of FIGS. 7 through 10 may include relative orifice or flow area sizing between the ports and openings corresponding to the aftward intake section, the forward intake section, and the headend intake section. According to preferred embodiments, the relative orifice sizing is configured for metering the combustor air supply between the forward injector 21 and the staged injector 51. According to certain embodiments, this metering of the combustor air supply includes directing at least 30% of the supply to the staged injector 51. According to other preferred embodiments, at least 50% of the combustor air supply is directed to the staged injector 51.

With reference now to FIGS. 11 through 13, according to alternative embodiments, the aftward annulus section and/or the forward annulus section may include heat transfer structure for increasing the heat transfer rate occurring between airflow moving through the annulus and the outer surface of the inner radial wall 24. The heat transfer structure may include any type of structure that promotes turbulent flow and thereby increases heat transfer by breaking up the thermal layers that develop in the coolant as it is moves through the passage. In this manner, fresh coolant, i.e., airflow that has not already absorbed heat from the inner radial wall 24, may be brought into contact with the wall so that the greater temperature differential increases the heat transfer rate. The heat transfer structure also may include configurations that increase the surface area of the inner radial wall 24 and, thereby, increase the rate at which energy is exchanged between the wall and the airflow moving through the annulus 26. Note that FIGS. 11 through 13 further illustrate several types of staged injectors according to preferred embodiments. A first type of staged injector 51, as shown in FIG. 11, includes a nozzle 53 in which an injection port 61 that resides substantially flush with the hot side of the inner radial wall 24. A second type of staged injector 51, as shown in FIG. 12, includes a fuel and air mixing chamber 62 that resides exterior to the flow annulus, i.e., outboard of the outer radial wall 25. The mixing chamber 62 may be formed by a rounded shield wall 63 that bulges out from the outer surface of the outer radial wall 25. As will be appreciated, the mixing chamber 62 may provide a larger interior to the staged injector 51 for improved mixing of the fuel and air before injection into the working fluid flowpath. A third type of staged injector 51 includes a jutting nozzle 53 that extends from the inner surface of the inner radial wall 24 so to penetrate the working fluid flowpath 37. This type of nozzle 53 is often referred to as an immersed injector because it includes injection ports and, for example, may be used to disperse the injected fuel/air mix more evenly within the working fluid flowpath 37.

As illustrated in FIG. 11, according to one preferred embodiment, the heat transfer structure includes a plurality of turbulators 81 formed on the outer surface of the inner radial wall 24. As will be appreciated, the turbulators 81 may be configured as protuberances that jut from the inner radial wall into the flow annulus 26. As illustrated, in one preferred embodiment, such turbulators 81 may take the form of circumferentially extending ridges. According to other embodiments, the turbulators 81 may be configured as discrete bumps, dimples or the like. The turbulators 81 may be positioned in the flow annulus 26 to either side of the staged injector 51, i.e., within the aftward annulus section or the forward annulus section or both. According to another embodiment, as illustrated in FIG. 12, the heat transfer structure may include a series of grooves 82 formed perpendicular to the general direction of flow through the flow annulus 26. The grooves 82 may be formed on the outer surface of the inner radial wall 24, and may be included to either side of the staged injector 51. Other configurations are also possible.

FIG. 13 illustrates another type of heat transfer structure in accordance with an alternative embodiment of the present invention. As illustrated, microchannels 83 may be formed through the outer surface of the inner radial wall 24. The microchannels 83 may include shallow grooves. According to one embodiment, the grooves may be enclosed, as illustrated. Alternatively, the grooves may remain open to the flow annulus 26. As illustrated, each of the microchannels 83, for example, may be configured as an axially aligned shallow channel that includes an inlet port and outlet port opening to the flow annulus 26, with an enclosed section that extends therebetween. The microchannels 83 further may include those described or referenced in pending U.S. patent application filed on Nov. 18, 2015, Ser. No. 14/944,341, which is incorporated herein by reference in its entirety. As will be appreciated, during operation, airflow that is impinged against the outer radial wall by the impingement ports 41 may be forced into inlet ports of the microchannels 83 such that airflow is created therethrough. This airflow induces improved heat transfer rates as both a greater surface area of the inner radial wall 24 is exposed, and the microchannels 83 allow coolant to penetrate the outer surface of the inner radial wall 24. In this manner, the cooling effect is not limited to only the surface of the inner radial wall 24. As will be appreciated, the advantages of this strategy include reducing steep temperature gradients that otherwise would form. According to certain embodiments, the flow annulus 26 itself may be formed and wholly contained within the inner radial wall 24 by a collection of microchannels 83 formed within the inner radial wall 24. As used herein, the term "flow annulus" should be understood to include such a meaning.

Figure 14:
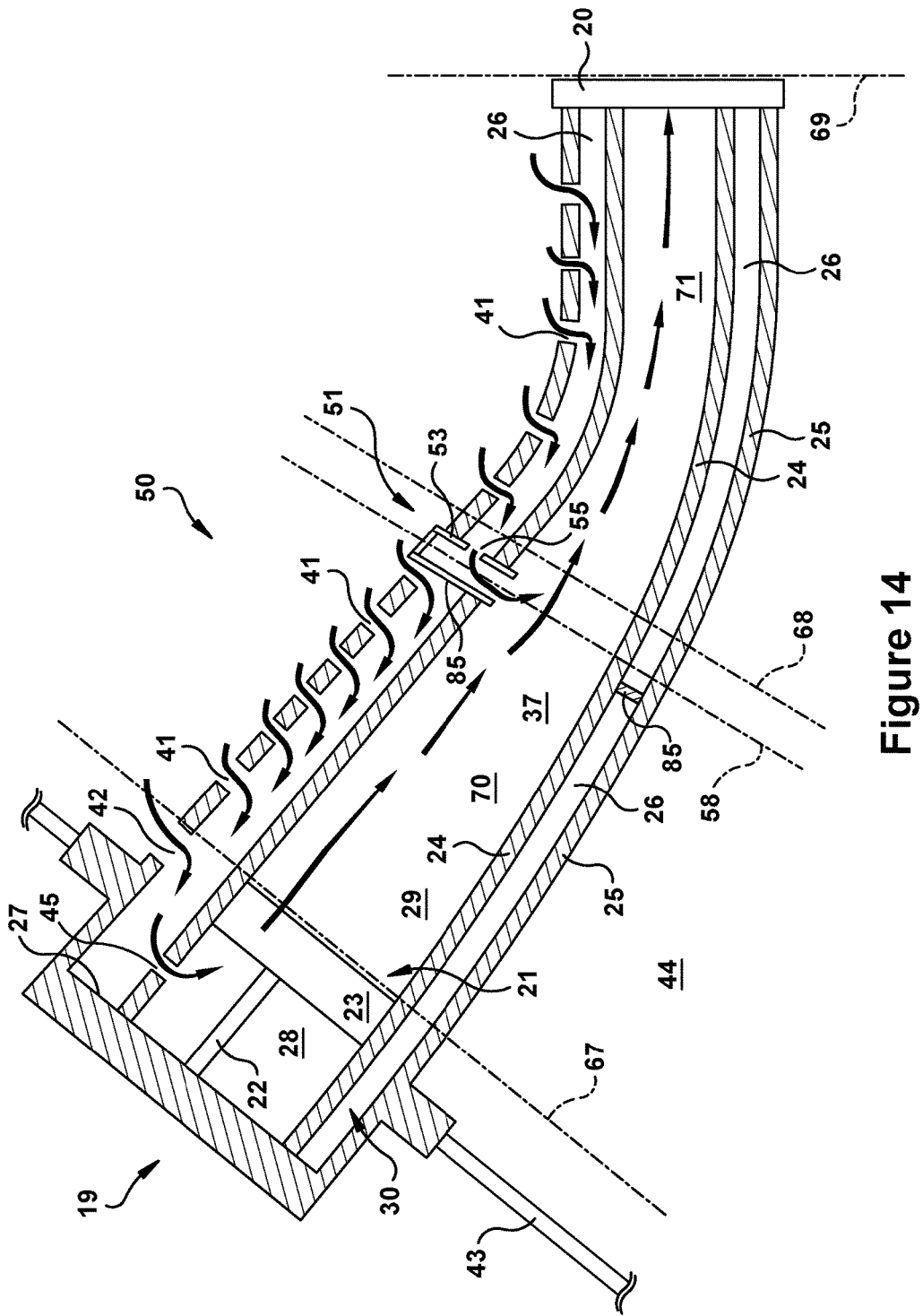
FIG. 14 is a simplified sectional representation of a combustor illustrating a configuration and the induced airflow therethrough according to an alternative embodiment of the present invention.

With reference now to FIG. 14, an alternative embodiment is provided in which sealing structure or an axial partition 85 within the flow annulus 26 prevents or restricts the movement of air past the staged injector 51. This, as illustrated, may be used to induce a different type of flow circulation through the combustor and new cooling strategy. As will be explained, this creates airflow to the staged injector 51 from the aftward annulus section of the flow annulus 26, while the flow within the forward annulus section of the flow annulus 26 is directed toward the forward injector 21. As used herein, axial partitions include both walls and other sealing structures as well as fluid seals. Further, unless otherwise stated, such axial partitions may seal a passage completely or partially.

As with the other examples discussed herein, the embodiment of FIG. 14 includes a staged injection system 50 having a forward injector 21 and, axially spaced aftward from the forward injector 21, a staged injector 51 that has an injection point within the combustion zone 29. The injection point, thus, is aftward and downstream from the forward injector 21. Relative to this injection point, an aftward annulus section may be defined to an aftward side of the injection point, and a forward annulus section may be defined to a forward side of it. Also, as previously described in relation to other embodiments, the air directing structure of the example of FIG. 14 may include axially defined intake sections formed along the outer radial wall 25. As illustrated, these intake sections may include one or more ports or openings formed through the outer radial wall 25 that fluidly connect the surrounding compressor discharge cavity 44 to a corresponding section of the flow annulus 26. Accordingly, an aftward intake section may be defined through the outer radial wall 25 that corresponds to the aftward annulus section, and a forward intake section may be defined through the outer radial wall 25 that corresponds to the forward annulus section. The intake sections each may include a plurality of impingement ports 41 and/or openings 42.

As indicated by the arrows of FIG. 14, the air directing structure of this embodiment is configured so to direct air entering the aftward annulus section through the aftward intake section in a forward direction and toward the staged injector 51. In this manner, air entering the flow annulus 26 through ports positioned aftward of the staged injector 51 is directed to the staged injector 51 for ingestion therewithin. Unlike the embodiments of FIGS. 7 through 13, however, the air directing structure related to FIG. 14 is configured so to direct air entering through the forward intake section (i.e., forward of the staged injector and the injection point thereof) in a forward direction through the forward annulus section. In this manner, as indicated, air entering the flow annulus 26 through ports positioned forward of the staged injector 51 is directed to the forward injector 21 for ingestion therewithin. As will be appreciated—and to avoid unnecessary repetition—the positioning of the staged injector 51 may include any of those locations already discussed above in relation to other embodiments. It will further be understood that any of the other alternatives and features discussed herein—such as the types of injectors or heat transfer structure—may be applicable in a similar manner to the embodiment shown in FIG. 14, particularly as the scope of the appended claims allow.

Thus, the embodiment of FIG. 14 includes a configuration in which air entering the flow annulus 26 at an aftward position relative the staged injector 51 is directed to the staged injector 51 for use therein, while air entering the flow annulus 26 at a forward relative the staged injector 51 is directed to the forward injector 21. This may be accomplished, as illustrated, via the axial partition 85, which may be configured as a wall, seal, or the like. As shown in the illustrated example, the axial partition 85 may be formed as a wall that connects at an outboard end to the outer radial wall 25 and at an inboard end to the inner radial wall 24. The partition 85 may extend about the circumference of the flow annulus 26. As will be appreciated, the partition 85 may be positioned within flow annulus 26 so to impede, limit or prevent entirely the airflow within the aftward annulus section from flowing past the approximate axial position of the staged injector 51. That is to say, the axial partition 85 may direct or guide the totality of the airflow within that section of the flow annulus 26 into the staged injector 51.

The nozzle 23 of the staged injector 51 may include a port 55 this air flow from the flow annulus 26.

Figure 15:
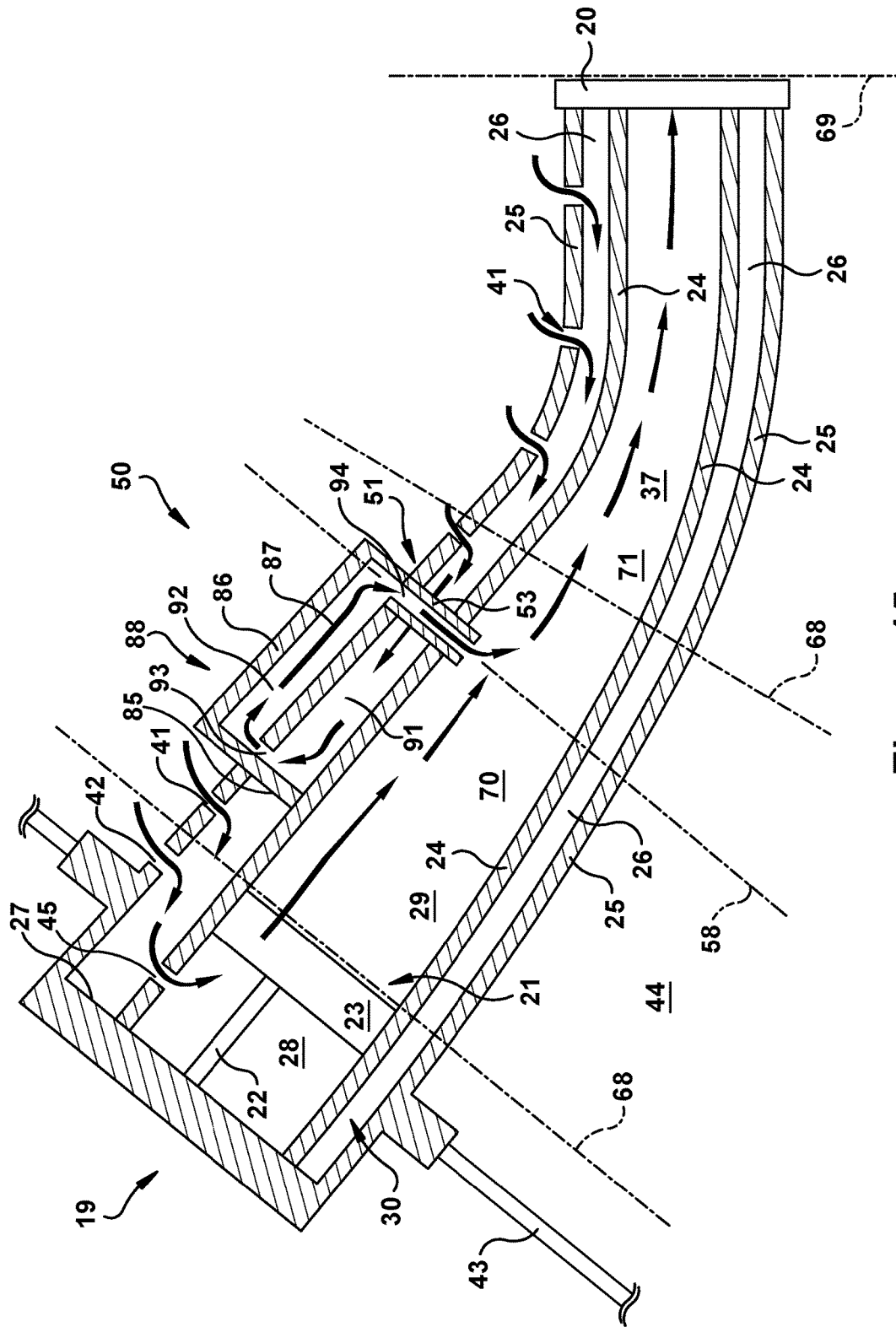
FIG. 15 is a simplified sectional representation of a combustor illustrating a configuration and the induced airflow therethrough according to an alternative embodiment of the present invention.

According to another embodiment, as illustrated in FIG. 15, the air directing structure may include a third radial wall 86 formed about and outboard of the outer radial wall 25 so to create an outboard flow annulus 86 therebetween. As illustrated, a switchback coolant flowpath 88 may be arranged that ultimately delivers an airflow derived from the compressor discharge cavity 44 to the staged injector 51. As indicated, the switchback coolant flowpath 88 may include an upstream section 91 formed within a section of the flow annulus 26 followed by a downstream section 92 formed within the outer flow annulus 87. In this manner, the switchback coolant flowpath 88 may redirects a flow moving forward through the flow annulus 26 into an aftward flow moving through the outer flow annulus 87.

The switchback coolant flowpath 88 may include a forward port 93 and an aftward port 94 formed through the outer radial wall 25. As illustrated, the forward port 93 may fluidly connect the upstream section 91 to the downstream section 92 of the switchback coolant flowpath 88. The aftward port 94 may fluidly connect the downstream section 92 of the switchback coolant flowpath 88 to the nozzle 53 of the staged injector 51. As further shown, the third radial wall 86 may be formed as solid continuous structure that encloses both the forward and aftward ports 93, 94 and fluidly isolates flow through the outer flow annulus 87 from flow in the surrounding compressor discharge cavity 44.

As will be appreciated, according to preferred embodiments, an axial partition 85 may be formed within the flow annulus 26 to create the desired flow into the switchback coolant flowpath 88. The axial partition 85 may be form the forward termination point of the upstream section 91 of the switchback coolant flowpath 88. As will be understood, the axial partition 85 may be forwardly spaced from the staged injector 51. The staged injector 51 may intersect the flow annulus through the upstream section 91 of the switchback coolant flowpath 88. The axial partition 85 may be configured as a partial or complete partition, and may include a wall or other fluid seal that extends between the outer radial wall 25 and the inner radial wall 24 and about a circumference of the flow annulus 26 so to prevent axial flow within the flow annulus 26.

Relative the axial position of the axial partition 85, the flow annulus 26 may be described as divided into an aftward annulus section, which is defined to an aftward side the axial partition 85, and a forward annulus section, which is defined to a forward side of the axial partition 85. The air directing structure may include axially defined intake sections formed through the outer radial wall 25 that fluidly connect the compressor discharge cavity 44 to corresponding axially defined sections of the flow annulus 26. According to preferred embodiments, these intake sections may include an aftward intake section that corresponds to the aftward annulus section, and a forward intake section that corresponds to the forward annulus section. According to other preferred embodiments, the axial partition 85 may be configured to fluidly seal the forward annulus section from the aftward annulus section such that: substantially all of the air of the combustor air supply flowing into the forward annulus section is directed to the forward injector 21; and substantially all of the air of the combustor air supply flowing into the aftward annulus section is directed through the switchback coolant flowpath for delivery to the staged injector 51.

As indicated, pursuant to exemplary embodiments of the switchback coolant flowpath 88, the airflow through the flow annulus 26 that enters aftward relative to the position of the axial partition 85 may be directed in a forward direction. This airflow may be allowed to pass the position of the staged injector 51 and continue to the forward port 93. In other words, the airflow travels from the aftward annulus section to the forward annulus section via circumferential gaps that may be exist between the staged injectors 51. This flow then may continue flowing toward the forward end of the compressor 13 until reaching a point at which the switchback coolant flowpath 88 is configured to reverse the flow approximately 180°. Specifically, as illustrated, the airflow may be made to "double back" via the switchback coolant flowpath 88 such that it is directed toward the staged injector 51 for eventual delivery thereto via the aftward port 94.

According to exemplary embodiments, the switchback coolant flowpath 88 may be configured such that airflow through the flow annulus 26 is directed into an outer flow annulus 87 formed about the outer radial wall 25. Specifically, the third radial wall 86 may be formed outboard of and offset from the outer radial wall 25 such that a second flow annulus, i.e., the outer flow annulus 87, is formed therebetween. The airflow within the outer flow annulus 87 may be directed to the aftward port 94 where it may be ingested by the staged injector 51. As described herein, within the staged injector 51, the airflow may be mixed with a fuel and injected into the working fluid flowpath 37. As will be appreciated, the type and placement of the staged injector 51 may be consistent with the alternatives as already described herein in relation to other embodiments.

As will be appreciated, the exemplary embodiments of FIGS. 7 through 15 provide novel configurations and induced airflow patterns in which a significant portion of the body of the combustor is cooled primarily by airflow ultimately destined for injection through the staged injectors instead of via the forward injector at the combustor headend. Given the increasing levels of combustor air being directed to axially staged injectors, the configurations described herein offer greater system efficiencies, such as the reduction of pressure losses and the more efficient use of cooling air. Early injection systems employing axial staging directed a relatively small fraction of the total air to the staged injectors—i.e., approximately 5% to 20%—while newer systems now direct much more to staged injectors. As a result, it becomes possible to use the air destined for injection by the staged injectors to cool significant portions or all of the unibody or inner radial wall that define the combustion zone, which may stream line the overall aerodynamics of the systems. As the demand for greater masses of air through combustor continues to climb, the advantages of such systems as the ones described herein have been found significant. As will be appreciated, in conventional systems, cooling configurations for the combustion zone defining inner radial wall are linked in series, with most of the airflow associated therewith being directed to the combustor headend and the forward injector positioned therein. This leads to the total system pressure loss being composed of component losses that are serially connected, which resulted in the staged injector receiving the total system pressure loss across it. When the cooling of the combustor body is substantially removed from the series of component pressure losses (as proposed herein), the overall system pressure loss may be significantly lowered, as more of the component pressure losses now operate in parallel. Depending on operator preference, the configurations disclosed herein may enable that reallocation of system pressure losses. That is to say, more pressure loss may be expended within the forward injector for improving the mixing of fuel and air therewithin.

Aspects of the present invention additionally may be used to reduce issues associated with impingement cooling within the annulus. In conventional systems, as will be appreciated, much of the air that ultimately feeds into the forward injector enters the flow annulus at or near the aftward end of it. This air is then required to flow through the length of the flow annulus or, at least, a significant portion thereof, which results in the flow colliding with fresh coolant just entering the flow annulus through, for example, impingement ports positioned along the length of the unibody. This results in aerodynamic mixing and momentum losses that increase the overall pressure loss of the system. Further, the crossflow of spent coolant that develops within the flow annulus reduces the effectiveness of the fresher coolant just arriving. This is because the impinged airflows of the impingement ports are most effective when trained directly against the surface to be cooled, i.e., at a steep angle around 90°. The crossflow interferes with the jets of impinged coolant via deflecting them in the direction that the crossflow is moving such that they strike the outer surface of the inner radial wall at a shallower angle. Pursuant to the designs of the present application, these issued may be minimized or substantially eliminated by reducing the extent to which much of the coolant travels in the flow annulus before reaching the point of injection. Additionally, pursuant to certain preferred embodiments, the necessity for coolant to flow through sections of the flow annulus that are partially blocked by the nozzles and other components related to the staged injectors may be minimized or substantially eliminated. This means that coolant entering the aftward portions of the flow annulus no longer has to move past those sections of the flow annulus that have been narrowed due to the intersecting components of the staged injectors. This has the advantage of not only eliminating the pressure losses associated these narrowed sections, but also elevates those issues that stem from the wakes that form downstream of the intersecting structure. These issues include those associated with the disruption to the surface cooling caused by the wakes, as well as flow disruption and uneven downstream airflow in the forward injector. As will be appreciated, embodiments of the present invention allow delivery of increased volumes of air to the staged injectors, while limiting the volume of air that is has to flow past the obstacles within the flow annulus that the staged injectors require.

With reference now generally to FIGS. 16 through 22, additional embodiments of the present invention are shown in which a portion of the combustor air supply is first circulated as coolant through stator blades 17 within the turbine 12 before being directed to the staged injector 51 for injection into the working fluid. As will be appreciated, the systems and components of the present embodiments may include several similarities with the ones discussed above. For example, a working fluid flowpath 37 may be defined through the combustor 13 and turbine 12 sections of the gas turbine 10. Similar to the configuration shown in FIG. 5, the working fluid flowpath 37 may extend aftward along a longitudinal central axis 57 from a forward end defined by the forward injector 21 in the combustor 13, through an interface at which the combustor 13 transitions to the turbine 12, and then through the turbine 12 to an aftward end defined therein. (Note that "interface" terminology is intended to include configurations in which a seamless transition is made between the combustor 13 and turbine 12 sections of the engine, i.e., wherein the combustor 13 and turbine 12 are joined across an integral unibody.) Additionally, a compressor discharge cavity 44 may be formed about the working fluid flowpath 37 for receiving a combustor air supply delivered thereto by the compressor 11. The gas turbine may include a staged injection system 50 that includes a forward injector 21 and, axially spaced aftward therefrom, a staged injector 51. As discussed in more detail below, the system further may include: fuel directing structure for apportioning a combustor fuel supply between the forward injector 21 and the staged injector 51; and air directing structure for apportioning the combustor air supply between the forward injector 21 and the staged injector 51.

With further reference to FIGS. 16 through 22, the air directing structure may include one or more coolant flowpaths 101, each of which providing a one directional, continuous fluid passageway through which coolant derived from the compressor discharge cavity 44 is routed for eventual delivery to the staged injector 51. Specifically, the coolant flowpath 101 may include a section that directs the coolant through the interior of a stator blade 17. Then, after passing through the stator blade 17, the coolant flow path 101 may direct the coolant to the staged injector 51, where it is mixed with a fuel and injected into the working fluid flowpath 37. According to preferred embodiments, the coolant flowpath 101 may generally include an intake section 103, a cooling circuit 104, and an outtake section 105. As will be discussed in more detail below, the intake section 103 may include an upstream port, which is fluidly coupled to the compressor discharge cavity 44, and a downstream port, which may be formed through the inboard sidewall or the outboard sidewall of one of the stator blades 17. The outtake section 105 may include a downstream port, which is fluidly coupled to the staged injector 51, and an upstream port, which also may be formed through the inboard sidewall or the outboard sidewall of one of the stator blades 17. The cooling circuit 104 may be a cooling channel that extends through the interior of one of the stator blades 17. The cooling circuit 104 may include an upstream end, which connects to the downstream port of the intake section 103, and a downstream end, which connects to the upstream port of the outtake section 105.

As discussed, the turbine 12 may include several stages of blades, each stage of which may include a row of stator blades 17 followed by a row of rotor blades. A row of stator blades 17 may include multiple stator blades 17 circumferentially spaced about a turbine rotor disc. As illustrated, each of the stator blades 17 may include an airfoil 113 that extends across the working fluid flowpath 37. The airfoil 113 is the portion of the stator blade 17 that is configured to interact with the flow of working fluid through the turbine 12. The stator blade 17 may include sidewalls that flank the airfoil 113 and secure it to stationary structure within the turbine 13. Specifically, the airfoil 113 may connect to an inboard sidewall, which, upon installation, may be made to define an inboard boundary of the working fluid flowpath 37, and an outboard sidewall, which, upon installation, may be made to define an outboard boundary of the working fluid flowpath 37. As will be appreciated, the airfoil 113, the inboard sidewall, and outboard sidewall may be integrally formed components of the stator blade 17. For description purposes, an axial width of the stator blade 17 is defined as the axial distance between a leading edge 114 and trailing edge 115 of the airfoil 113. Further, as used herein, a forward most row of stator blades 17 designates the row of stator blades 17 that is positioned closest to the forward end of the turbine 12, i.e., closest to the interface between the combustor 13 and the turbine 12.

As now presented, with continued reference to FIGS. 16 through 22, a flow annulus 26 may be formed about the working fluid flowpath 37 through sections of both the combustor 13 and turbine 12. Within the combustor 13, the flow annulus 26 may be configured in the manner already discussed above. As illustrated, the portion of the flow annulus 26 formed within the turbine 12 may appear similarly configured due to the nature of the cross-sectional views provided in the figures. However, as will be appreciated, due to the differing configurations of the working fluid flowpath 37 in the combustor 13 and turbine 12, the flow annulus 26 within the turbine 12 may have certain characteristics not found in the section within the combustor 11. These characteristics will be defined below.

As an initial matter, though, it should be understood that general reference to the "flow annulus" may refer to either the flow annulus formed about the working fluid flowpath 37 of the combustor 13, the turbine 12, or both. When making such general references, the flow annulus 26 will be described as being defined between a flowpath wall 108 and an annulus wall 109, as indicated through the several figures. Thus, the working fluid flowpath 37 through the combustor 13 and/or the turbine 12 may be generally referred to as being defined by the flowpath wall 108, while the flow annulus 26 may be generally described as being defined between the flowpath wall 108 and the annulus wall 109. Further, as used herein, the flowpath wall 108 may be described as having opposing hot and cold sides, with the hot side being the side that faces the working fluid flowpath 37 (and the hot combustion gases contained therein), and the cold side being the one that faces the flow annulus 26 (and the relatively cooler airflow contained therein). Accordingly, in general, the annulus wall 109 may be described as surrounding and being offset from the cold side of the flowpath wall 108 such that the flow annulus 26 is formed therebetween.

Returning to the differences between the working fluid flowpath 37 and flow annulus 26 within the combustor 13 and turbine 12, the following terminology will be used to discern features particular to each in accordance with a common turbine engine configuration. As will be appreciated, this common configuration includes a plurality of cylindrically shaped combustors 13 that each connect to an annular segment of an annularly shaped working fluid flowpath 37 formed through the turbine 12. Within the combustor 13, this means that the generalized "flowpath wall" and "annulus wall" terminology may be understood as representing what was previously referred to herein as the "inner radial wall" and "outer radial wall", respectively. Within the turbine 12, however, these generalized terms—i.e., the "flowpath wall" and "annulus wall"—may be further refined so that particularly regions inherent to the annularly shaped flowpath may be identified. Accordingly, for the purpose of description, the "flowpath wall 108" within the turbine 12 may be described as having an inboard flowpath wall 108a and an outboard flowpath wall 108b, as indicated in the several figures. Thus, the inboard flowpath wall 108a, as will be understood, defines the inboard boundary of the working fluid flowpath 37, while the outboard flowpath wall 108b defines the outboard boundary of the working fluid flowpath 37. Similarly, the flow annulus 26 through the turbine 12 may include a flow annulus formed about the cold side of both the inboard flowpath wall 108a and outboard flowpath wall 108b. Accordingly, as shown in FIGS. 16 through 22, the flow annulus 26 within the turbine 12 may be more particularly described as including an inboard flow annulus 26a and an outboard flow annulus 26b. To form the inboard and outboard flow annulus 26a,b, the annulus wall 109 within the turbine 12 may be more particularly described as having an inboard annulus wall 109a and an outboard annulus wall 109b. Given these designations, as will be appreciated, the inboard annulus wall 109a may be offset from the cold side of the inboard flowpath wall 108a such that the inboard flow annulus 26a is defined therebetween. And, to the other side of the working fluid flowpath 37, the outboard annulus wall 109b is offset from the cold side of the outboard flowpath wall 108b such that the outboard flow annulus 26b is defined therebetween.

Further, it should be understood that there are many possible configurations by which the flow annulus 26 may be formed within the turbine 12 so to achieve the functionality described herein. Unless otherwise limited, such alternative arrangements should be considered as included in the scope of the appended claim set. That is to say, non-limiting language used herein should be understood to cover such any configuration by which compressed air may be derived from the compressor discharge cavity 44 and then delivered to particular locations along the exterior of the working fluid flowpath 37 of the turbine 12 for satisfying the functions described herein. As will be further understood, the stator blades 17 may include inboard and outboard sidewalls that attach to and secure the airfoils 113 within the working fluid flowpath 37. The inboard and outboard sidewalls may be configured to define, respectively, axial sections the inboard and outboard boundaries of the working fluid flowpath 37. Because of this, the inboard and outboard sidewalls may be considered components of the inboard flowpath wall 108a and outboard flowpath wall 108b, respectively.

Further, according to alternative embodiments, the combustor 13 may also be configured as an annular combustor. In such cases, the combustor 13 may include a continuous annularly shaped flowpath that connects to the annularly shaped flowpath of the turbine 12. It will be appreciated that the combustor 13 would then include an inboard flowpath wall 108a and an outboard flowpath wall 108b in the same manner as is shown for the turbine 12 in FIGS. 6 and 7. It should be understood that, while certain examples provided herein discuss can-annular configuration, the provided illustrations and the appended claims encompass either of the possible combustor configurations—i.e., annular or can-annular—unless specifically stated otherwise.

The embodiments of the present discussion may generally include a staged injection system 50 consistent with any of those described above. That is to say that the staged injection system 50 of FIGS. 16 through 22 may include any of those embodiments already discussed in relation to the preceding figures. Thus, for example, the staged injection system 50 may include a forward injector 21 and, axially spaced aftward therefrom, one or more staged injectors 51. Additionally, the staged injector 51 may be configured to intersect the flow annulus 26 so to attain an injection point within the working fluid flowpath 37. For description purposes, relative an axial position of the injection point, a forward annulus section may be defined to a forward side of the injection point, while an aftward annulus section is defined to an aftward side of the injection point. The staged injector 51 may include an axial partition 85, which may be configured to axially divide the flow annulus 26. According to certain embodiments, as previously described, the axial partition 85 may be positioned in the flow annulus 26 so to axially coincide with or be near the staged injector 51. The axial partition 111 may be configured to fluidly seal the forward annulus section from the aftward annulus section. This sealing arrangement may be done such that all or substantially all of the combustor air supply that enters the forward annulus section is directed to the forward injector 21, while all or substantially all of the combustor air supply entering the aftward annulus section is directed to the staged injector 51. As discussed in more detail below, the staged injector 51 may be positioned within the combustor 13 or the turbine 12.

Figure 16:
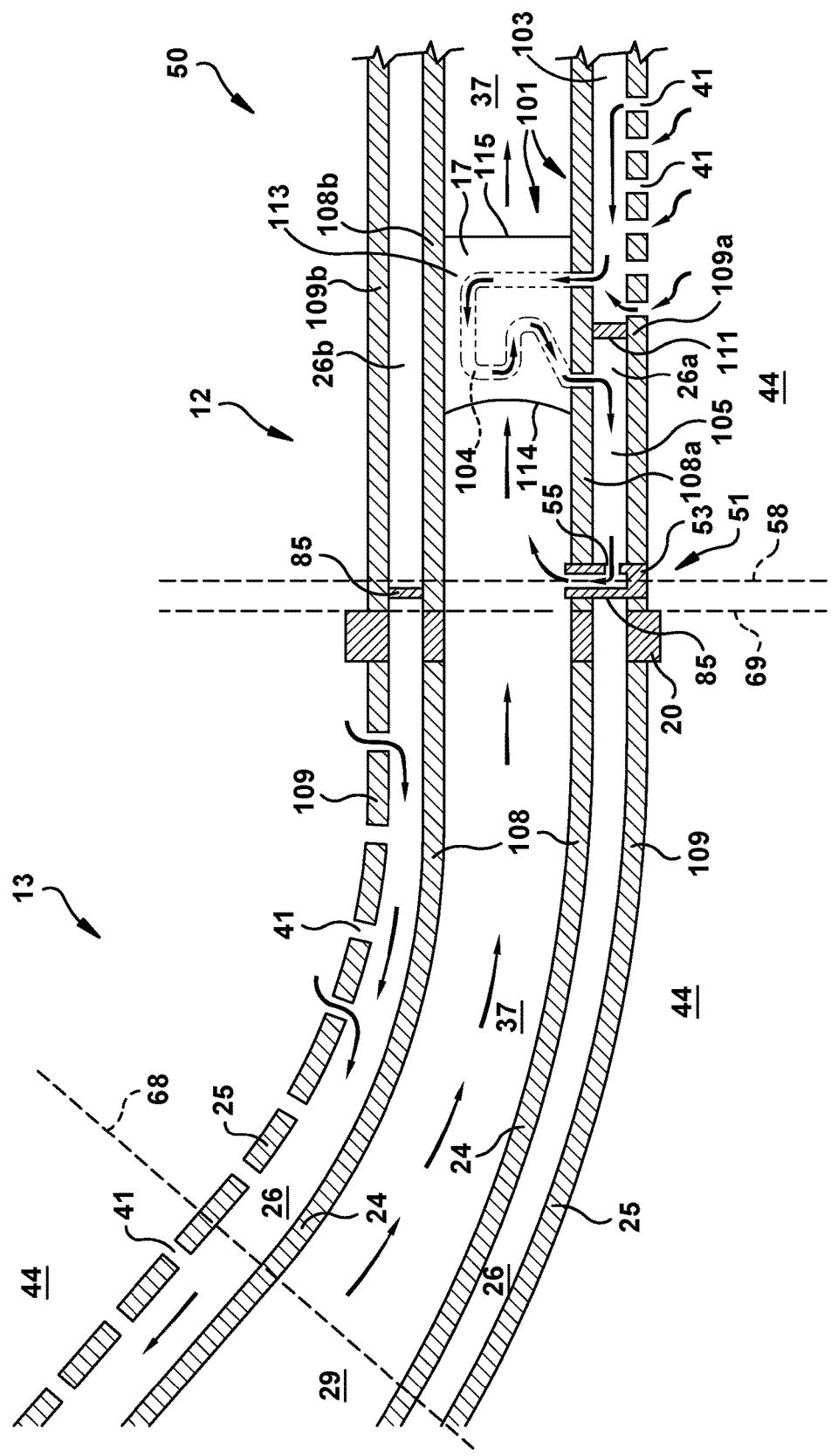
FIG. 16 is a sectional view of a working fluid flowpath through a combustor and turbine showing a cooling and staged injection configuration according to embodiments of the present invention.
Figure 17:
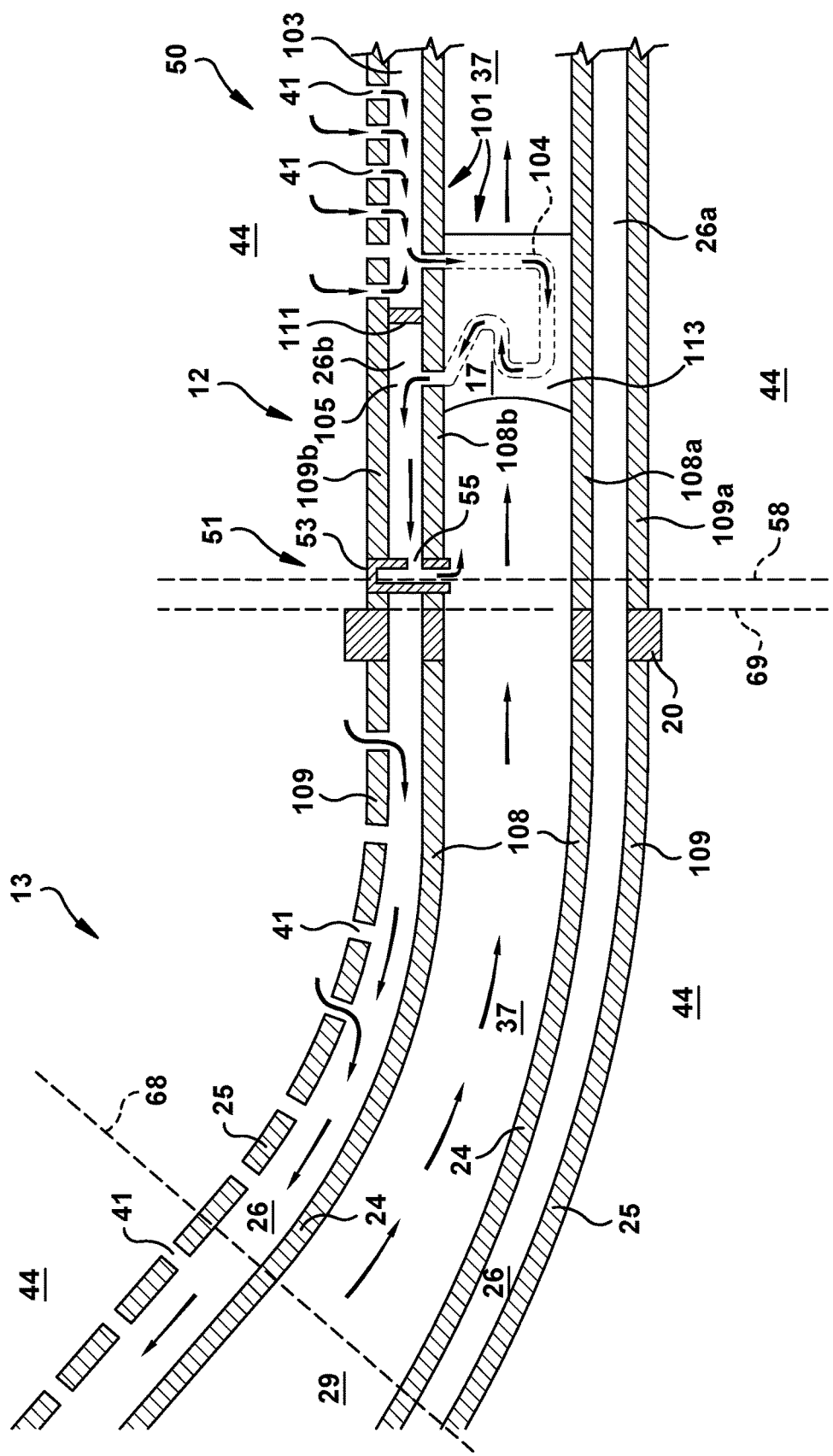
FIG. 17 is a sectional view of a working fluid flowpath through a combustor and turbine showing an alternative cooling and staged injection configuration according to embodiments of the present invention.
Figure 18:
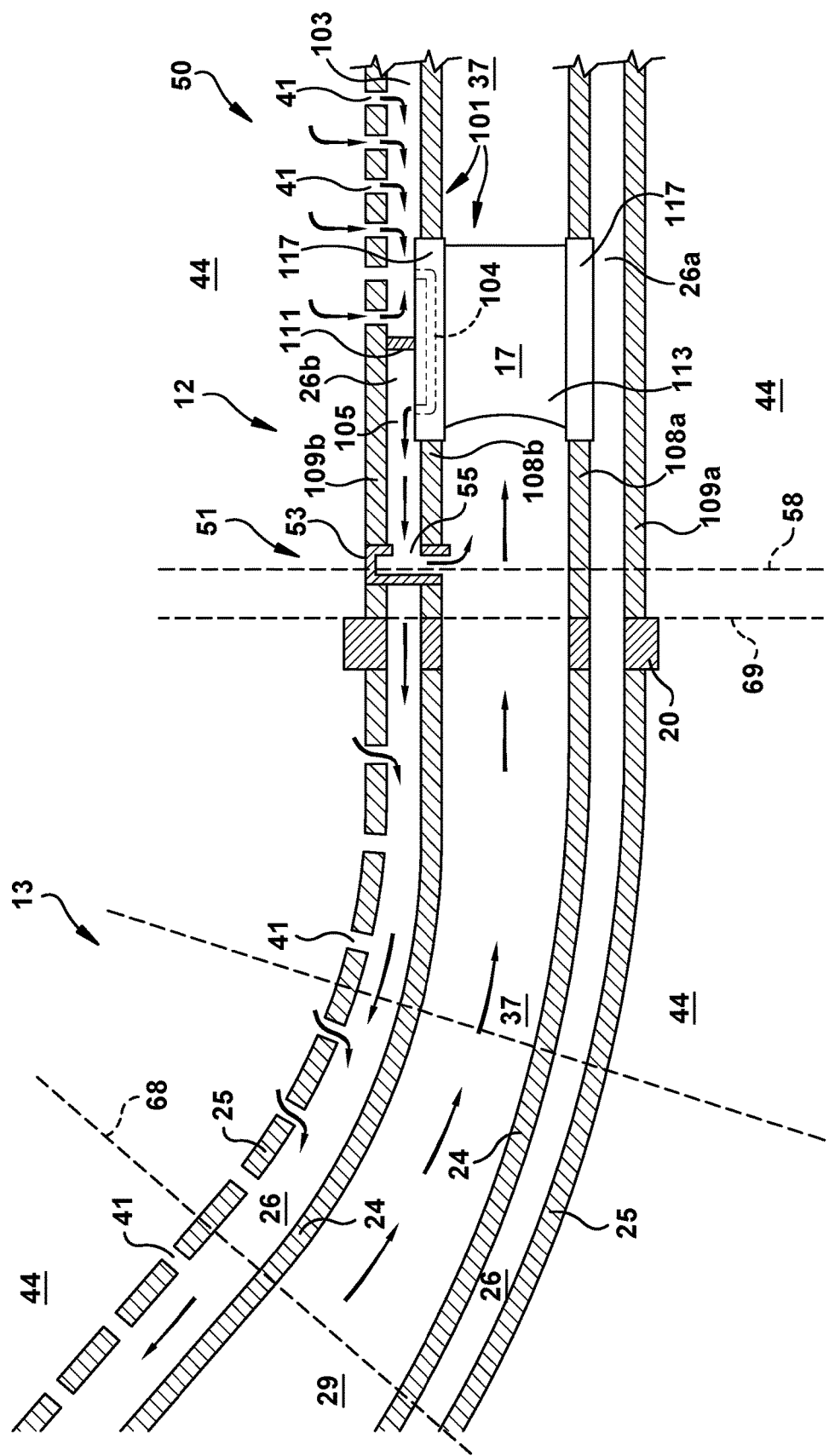
FIG. 18 is a sectional view of a working fluid flowpath through a combustor and turbine showing an alternative cooling and staged injection configuration according to embodiments of the present invention.

With particular attention now to FIGS. 16 and 18, embodiments of the present invention are provided that include a cooling circuit 104 having a looping configuration within the airfoil 113 of the stator blade 17. As illustrated, the air directing structure in these exemplary embodiments include a coolant flowpath 101 having an intake section 103, a cooling circuit 104, and an outtake section 105, which may be configured per to the alternative arrangements provided in FIGS. 16 and 17.

According to one alternative, as illustrated in FIG. 16, the cooling circuit 104 extends from and loops back to connections made with the inboard flow annulus 26a. As will be appreciated, between these connections, the cooling circuit 104 may form a cooling channel within the airfoil 113 of the stator blade 17. More specifically, as shown, the intake section 103 may include: an upstream port that is fluidly coupled to the compressor discharge cavity 44; and a downstream port that is formed through the inboard sidewall of the airfoil 113, or, more generally, the inboard flowpath wall 108a. As further shown, the outtake section 105 may include: a downstream port that is fluidly coupled to the staged injector 51; and an upstream port formed through the inboard sidewall of the airfoil 113, or, more generally, the inboard flowpath wall 108a. The cooling circuit 104 may be configured to extend through an interior of the airfoil 113 along a desired route chosen pursuant to cooling requirements, while fluidly connecting the intake section 103 to the outtake section 105. Accordingly, the cooling circuit 104 may include an upstream end that connects to the downstream port of the intake section 103 and a downstream end that connects to the upstream port of the outtake section 105. According to preferred embodiments, the cooling circuit 104 has a serpentine configuration so to enhance cooling efficiency within the airfoil 113.

According to another alternative, as illustrated in FIG. 17, the cooling circuit 104 extends from and loops back to connections made with the outboard flow annulus 26b. As will be appreciated, between these connections, the cooling circuit 104 may form a cooling channel within the airfoil 113 of the stator blade 17. More specifically, as shown, the intake section 103 may include: an upstream port that is fluidly coupled to the compressor discharge cavity 44; and a downstream port that is formed through the outboard sidewall of the airfoil 113, or, more generally, the outboard flowpath wall 108b. As further shown, the outtake section 105 may include: a downstream port that is fluidly coupled to the staged injector 51; and an upstream port formed through the outboard sidewall of the airfoil 113, or, more generally, the outboard flowpath wall 108b. The cooling circuit 104 may be configured to extend through an interior of the airfoil 113 along a desired route chosen pursuant to cooling requirements, while fluidly connecting the intake section 103 to the outtake section 105. Accordingly, the cooling circuit 104 may include an upstream end that connects to the downstream port of the intake section 103 and a downstream end that connects to the upstream port of the outtake section 105. The cooling circuit 104 may include a serpentine configuration so to enhance cooling efficiency within the airfoil 113.

As illustrated, the embodiments of FIGS. 16 and 17 may include an axial partition 111 positioned within the flow annulus 26. As will be appreciated, the intake section 103 and the outtake section 105 of the coolant flowpath 101 may include adjacent axial sections of the flow annulus 26 that reside to each side of the axial partition 111. According to preferred embodiments, the axial partition 111 may be configured to fluidly seal each of the adjacent axial sections from the other. Given this configuration, the intake section 103 of the coolant flowpath 101 may be described as residing to an aftward side of the axial partition 111, while the outtake sections 105 of the coolant flowpath 101 may be described as residing to a forward side of the axial partition 111. Though other configurations are possible, the axial partition 111 may be positioned within an axial range defined between the leading edge 114 and the trailing edge 115 of the stator blade 17.

As further illustrated in FIGS. 16 and 17, the upstream port of the intake section 103 of the coolant flowpath 101 may include openings formed through a corresponding section of the annulus wall 109 for allowing a portion of the combustor air supply entry into the intake section 103. These openings may be configured as impingement ports 41 formed through the annulus wall 109. Thus, according to preferred embodiments, the upstream port of the intake section 103 of the coolant flowpath 101 may include multiple impingement ports 41 formed through the annulus wall 109. As discussed more below, the openings or impingement ports 41 may be used to meter airflow to the staged injector 51 as well as to cool the components of the system. Surface ports and connector channels, as provided below, may also be included. Additionally, as indicated, such impingement ports 41 are excluded in the outtake section 105 of the coolant flowpaths 101. Finally, as will be appreciated, the staged injection system of the examples of FIGS. 16 and 17 may include any of the alternative embodiments and components discussed herein, including those relating to number, type, configuration, locations, etc. of staged injectors 51, as well as types of fuel and air directing structure.

In FIG. 18, the sidewalls 117 of the stator blade 17 are more particularly emphasized in the illustration so to describe an alternative embodiment in which the cooling circuit 104 is formed primarily through the sidewalls 117 of the stator blade 17. According to this alternative, as illustrated, the cooling circuit 104 extends from and loops back to connections made with the outboard flow annulus 26b, while, therebetween, forming a cooling circuit 104 within the sidewalls 117 of the stator blade 17. As will be appreciated, the cooling circuit 104 is shown in the outboard sidewall 117, but may also be formed in the inboard sidewall 117 as well. As with the embodiments of FIGS. 16 and 17, the intake section 103 may include: an upstream port that is fluidly coupled to the compressor discharge cavity 44; and a downstream port formed in the sidewall 117 of the airfoil 113. The outtake section 105 may include: a downstream port that is fluidly coupled to the staged injector 51; and an upstream port formed in the sidewall 117 of the airfoil 113. The cooling circuit 104 may be configured to extend through an interior of the sidewall 117 along a desired route chosen pursuant to cooling requirements therein, while fluidly connecting the intake section 103 to the outtake section 105. Accordingly, the cooling circuit 104 may include an upstream end that connects to the downstream port of the intake section 103 and a downstream end that connects to the upstream port of the outtake section 105. Though not shown, the cooling circuit 104 may include a serpentine configuration so to enhance cooling efficiency within the airfoil 113. As illustrated, the embodiment of FIG. 18 may include an axial partition 111 positioned within the flow annulus 26 to direct a desired flow of coolant through the cooling circuit 104.

Figure 19:
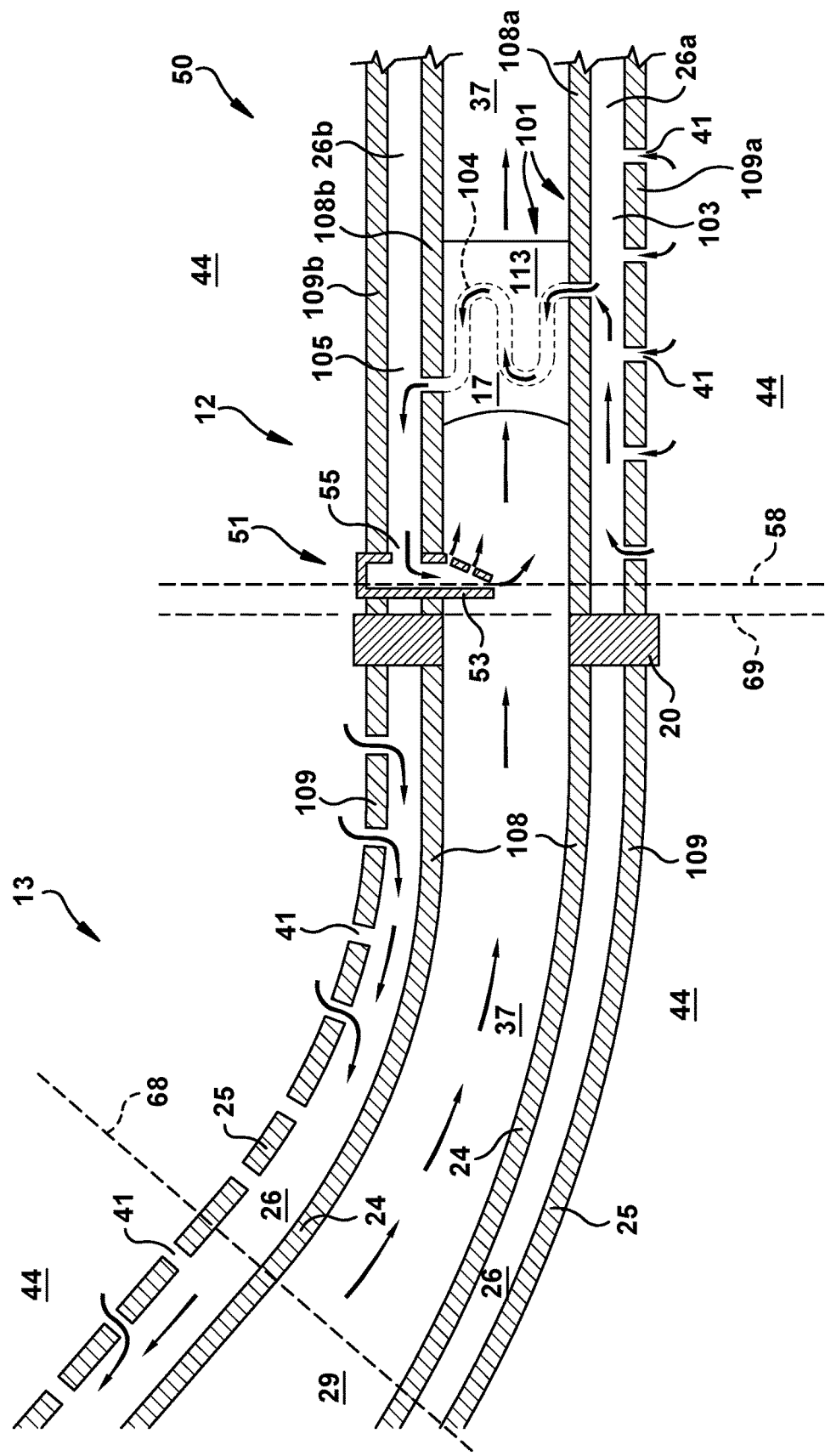
FIG. 19 is a sectional view of a working fluid flowpath through a combustor and turbine showing an alternative cooling and staged injection configuration according to embodiments of the present invention.
Figure 20:
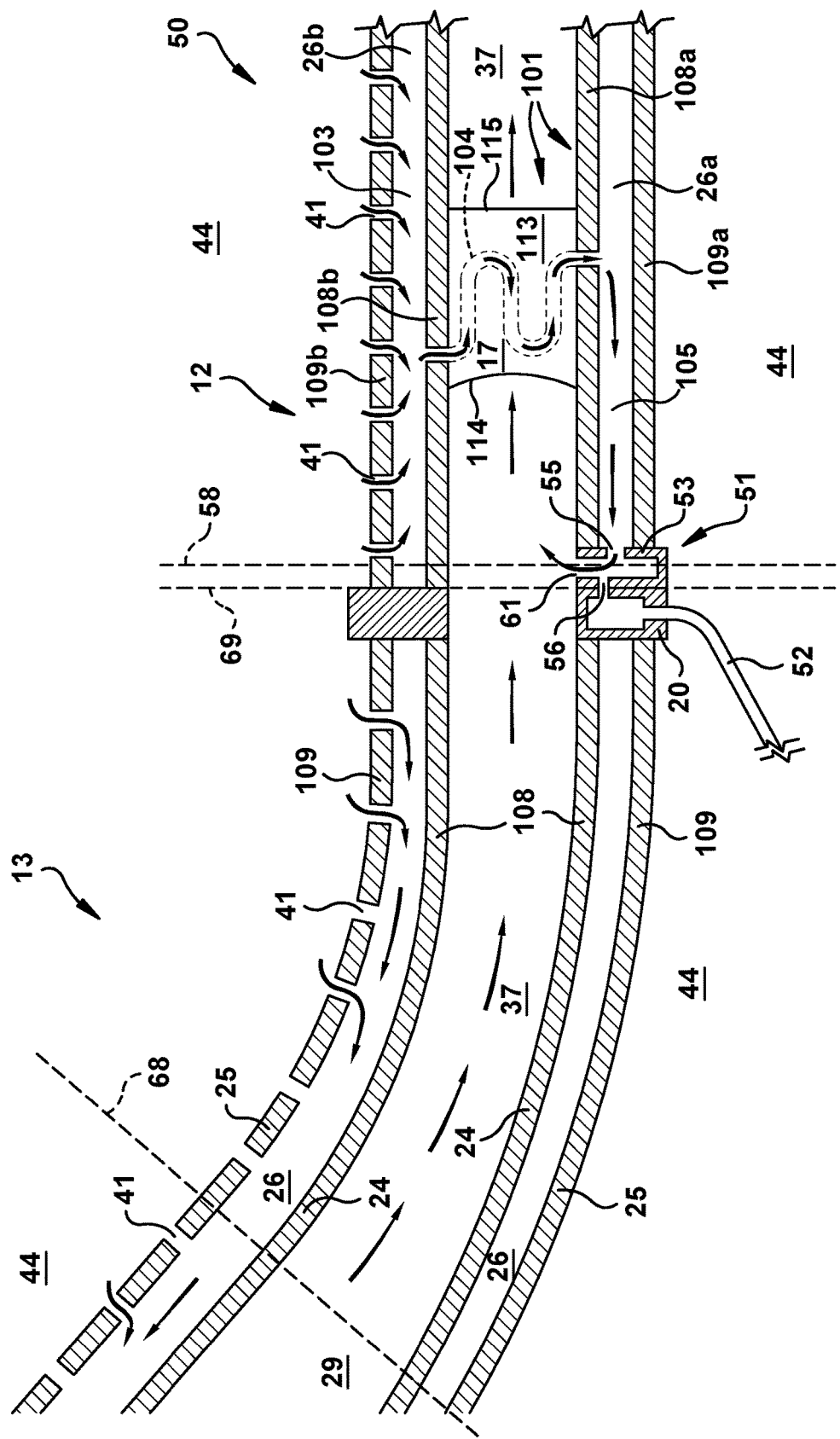
FIG. 20 is a sectional view of a working fluid flowpath through a combustor and turbine showing an alternative cooling and staged injection configuration according to embodiments of the present invention.

With particular attention now to FIGS. 19 and 20, embodiments of the present invention are provided that include a cooling circuit 104 that extends radially across the airfoil 113 of the stator blade 17. As illustrated, the air directing structure in these embodiments also may include a coolant flowpath 101 having an intake section 103, a cooling circuit 104, and an outtake section 105, which may be configured per to the alternative arrangements provided in FIGS. 18 and 19.

According to one alternative, as illustrated in FIG. 19, the cooling circuit 104 extends from an upstream connection made with the inboard flow annulus 26a to a downstream connection made with the outboard flow annulus 26b. As will be appreciated, between these connections, the cooling circuit 104 may form a cooling channel within the airfoil 113 of the stator blade 17. More specifically, as shown, the intake section 103 may include: an upstream port that is fluidly coupled to the compressor discharge cavity 44; and a downstream port that is formed through the inboard sidewall of the airfoil 113, or, more generally, the inboard flowpath wall 108a. As further shown, the outtake section 105 may include: a downstream port that is fluidly coupled to the staged injector 51; and an upstream port formed through the outboard sidewall of the airfoil 113, or, more generally, the outboard flowpath wall 108b. The cooling circuit 104 may be configured to extend through an interior of the airfoil 113 along a desired route chosen pursuant to cooling requirements, while fluidly connecting the intake section 103 to the outtake section 105. Accordingly, the cooling circuit 104 may include an upstream end that connects to the downstream port of the intake section 103 and a downstream end that connects to the upstream port of the outtake section 105. The cooling circuit 104 may include a serpentine configuration so to enhance cooling efficiency within the airfoil 113.

According to another alternative, as illustrated in FIG. 20, the cooling circuit 104 extends from an upstream connection made with the outboard flow annulus 26b to a downstream connection made with the inboard flow annulus 26a. As will be appreciated, between these connections, the cooling circuit 104 may form a cooling channel within the airfoil 113 of the stator blade 17. More specifically, as shown, the intake section 103 may include: an upstream port that is fluidly coupled to the compressor discharge cavity 44; and a downstream port that is formed through the outboard sidewall of the airfoil 113, or, more generally, the outboard flowpath wall 108b. As further shown, the outtake section 105 may include: a downstream port that is fluidly coupled to the staged injector 51; and an upstream port formed through the inboard sidewall of the airfoil 113, or, more generally, the inboard flowpath wall 108a. The cooling circuit 104 may be configured to extend through an interior of the airfoil 113 along a desired route chosen pursuant to cooling requirements, while fluidly connecting the intake section 103 to the outtake section 105. Accordingly, the cooling circuit 104 may include an upstream end that connects to the downstream port of the intake section 103 and a downstream end that connects to the upstream port of the outtake section 105. The cooling circuit 104 may include a serpentine configuration so to enhance cooling efficiency within the airfoil 113.

According to preferred embodiments, as illustrated in FIGS. 19 and 20, the intake section 103 and the outtake section 105 of the coolant flowpath 101 may be positioned so that each axially overlaps an axial range defined between the leading edge 114 and the trailing edge 115 of the airfoil 113 of the stator blade 17. According to other preferred alternatives, the intake section 103 and the outtake section 105 may be positioned so to axially overlap each other. The intake section 103 and the outtake section 105 of the coolant flowpath 101 may both be configured so to define an axial range that wholly includes therein the axial range defined between the leading edge 114 and the trailing edge 115 of the airfoil 113.

As further illustrated in FIGS. 19 and 20, the upstream port of the intake section 103 of the coolant flowpath 101 may include openings formed through a corresponding section of the annulus wall 109 for allowing a portion of the combustor air supply entry into the intake section 103. These openings may be configured as impingement ports 41 formed through the annulus wall 109. Thus, according to preferred embodiments, the upstream port of the intake section 103 of the coolant flowpath 101 may include multiple impingement ports 41 formed through the annulus wall 109. As discussed more below, the openings or impingement ports 41 may be used to meter airflow to the staged injector 51 as well as to cool the components of the system. Surface ports and connector channels, as provided below, may also be included. Additionally, as indicated, such impingement ports 41 are excluded in the outtake section 105 of the coolant flowpaths 101. Finally, as will be appreciated, the staged injection system of the examples of FIGS. 18 and 19 may include any of the alternative embodiments and components discussed herein, including those relating to number, type, configuration, locations, etc. of staged injectors 51, as well as types of fuel and air directing structure.

Figure 21:
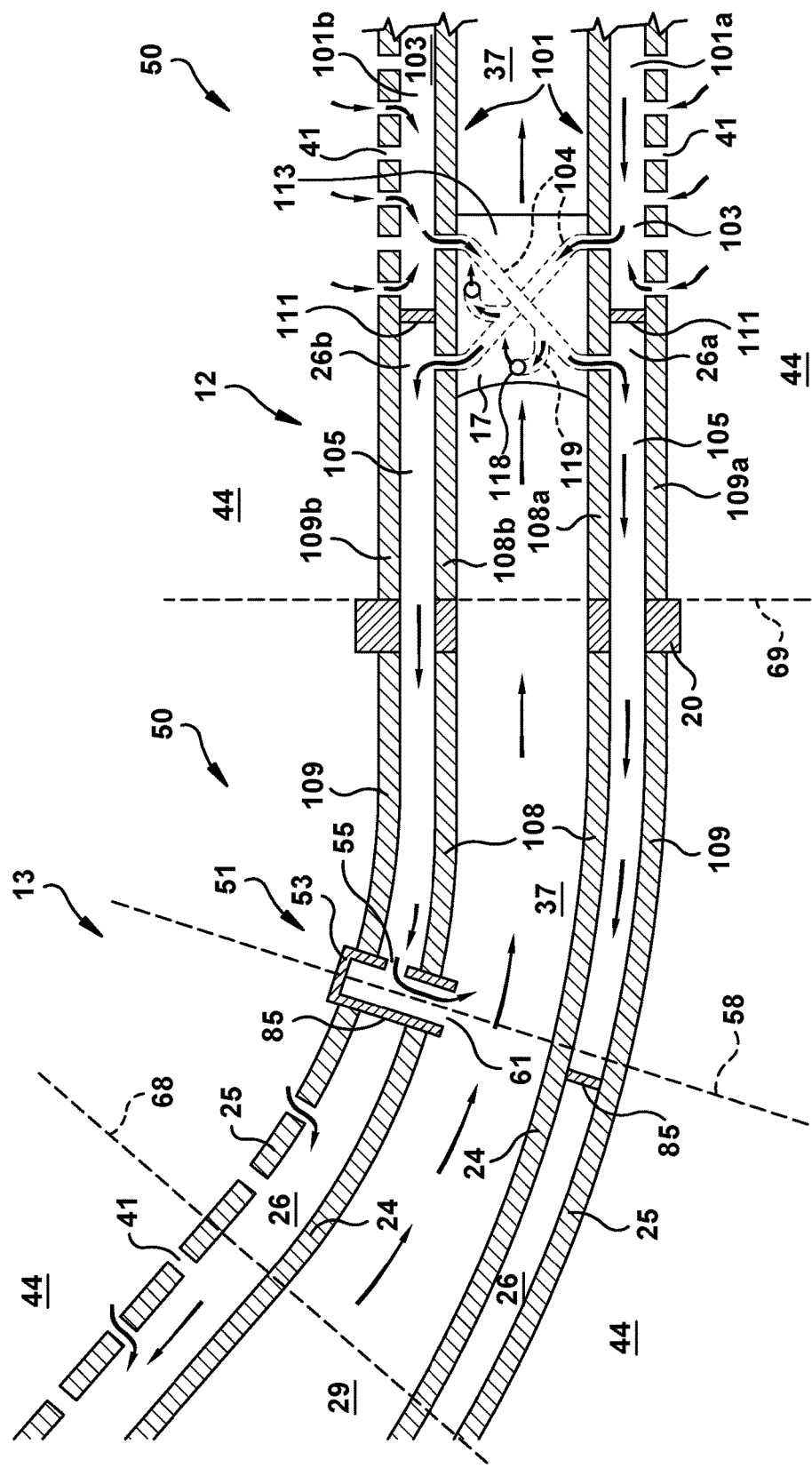
FIG. 21 is a sectional view of a working fluid flowpath through a combustor and turbine showing an alternative cooling and staged injection configuration according to embodiments of the present invention.
Figure 22:
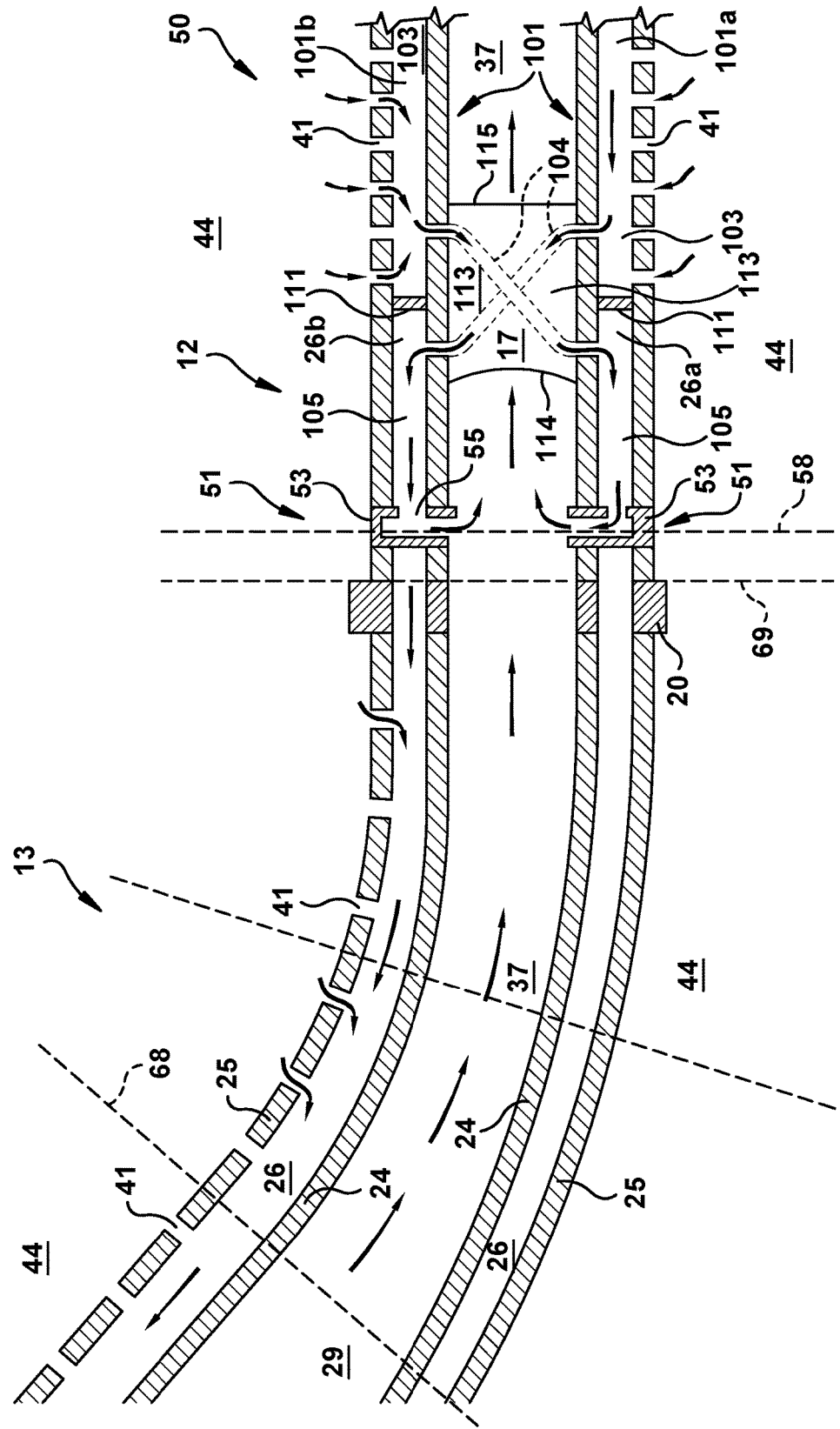
FIG. 22 is a sectional view of a working fluid flowpath through a combustor and turbine showing an alternative cooling and staged injection configuration according to embodiments of the present invention.

With particular attention now to FIGS. 21 and 22, embodiments of the present invention are shown in which a plurality of coolant flowpaths 101 are formed so to produce a crisscrossing configuration within the airfoil 113 of the stator blade 17. In these examples, as will be appreciated, the air directing structure may include at least two of the coolant flowpaths 101, each of which having an intake section 103, a cooling circuit 104, and an outtake section 105. For description purposes, as described more below, the cooling flowpaths 101 may include cooling circuits 104 that are configured to crisscross within the airfoil 113 as each extends radially in opposite directions between the inboard annulus and the outboard annulus.

According to a preferred embodiment, the air directing structure may include a first coolant flowpath 101a and second coolant flowpath 101b. The first coolant flowpath 101a may include: an intake section 103, which has an upstream port that is fluidly coupled to the compressor discharge cavity 44 and a downstream port that is formed through the inboard sidewall of the airfoil 113, or, more generally, the inboard flowpath wall 108a; an outtake section 105, which comprises a downstream port that is fluidly coupled to the staged injector 51 and an upstream port formed through the outboard sidewall, or, more generally, the outboard flowpath wall 108b; and a cooling circuit 104, which extends through an interior of the airfoil 113 of the stator blade 17 and connects the intake section 103 to the outtake section 105. The cooling circuit 104 may be configured to extend through an interior of the airfoil 113 along a desired route chosen pursuant to cooling requirements, while fluidly connecting the intake section 103 to the outtake section 105. Accordingly, the cooling circuit 104 may include an upstream end that connects to the downstream port of the intake section 103 and a downstream end that connects to the upstream port of the outtake section 105.

The second coolant flowpath 101b, as illustrated, may be configured to carry coolant across the airfoil 113 in the opposite direction. Thus, the second coolant flowpath 101b may include: an intake section 103, which has an upstream port that is fluidly coupled to the compressor discharge cavity 44 and a downstream port that is formed through the outboard sidewall of the airfoil 113, or, more generally, the outboard flowpath wall 108b; an outtake section 105, which comprises a downstream port that is fluidly coupled to the staged injector 51 and an upstream port formed through the inboard sidewall, or, more generally, the inboard flowpath wall 108a; and a cooling circuit 104, which extends through an interior of the airfoil 113 of the stator blade 17 and connects the intake section 103 to the outtake section 105. The cooling circuit 104 may be configured to extend through an interior of the airfoil 113 along a desired route chosen pursuant to cooling requirements, while fluidly connecting the intake section 103 to the outtake section 105. Accordingly, the cooling circuit 104 may include an upstream end that connects to the downstream port of the intake section 103 and a downstream end that connects to the upstream port of the outtake section 105.

As illustrated, axial partitions 111 may be included in each of the first and second flow annuluses 26a,b. As will be appreciated, the intake section 103 of the first coolant flowpath 101a and the outtake section 105 of the second coolant flowpath 101b may be configured as adjacent axial sections of the flow annulus 26 that reside to each side of the axial partition 111 positioned therewithin. According to preferred embodiments, the axial partition 111 is configured to fluidly seal each of the adjacent axial sections from the other. Similarly, the intake section 103 of the second coolant flowpath 101b and the outtake section 105 of the first coolant flowpath 101a may be formed as adjacent axial sections of the flow annulus 26 that reside to each side of the axial partition 111 positioned therewithin. The axial partition 111 also may be configured to fluidly seal each of the adjacent axial sections from the other. Given this configuration, the intake sections 103 of the first and second coolant flowpaths 101a,b may be described as residing to an aftward side of the axial partitions 111, while the outtake sections 105 of the first and second coolant flowpaths 101a,b may be described as residing to a forward side of the axial partitions 111. Though other configurations are possible, the axial partitions 111 may be positioned within an axial range defined between the leading edge 114 and the trailing edge 115 of the stator blade 17. As will be understood, the aforementioned configuration results in the downstream port of the intake section 103 of the first coolant flowpath 101a and the upstream port of the outtake section 105 of the second coolant flowpath 101b each being formed through the inboard sidewall (or, more generally, the inboard flowpath wall 108a), while the downstream port of the intake section 103 of the second coolant flowpath 101b and the upstream port of the outtake section 105 of the first coolant flowpath 101a are each formed through the outboard sidewall (or, more generally, the inboard flowpath wall 108a).

The upstream port of the intake sections 103 of the first coolant flowpath 101a and the second coolant flowpath 101b may include openings formed through corresponding sections of the annulus wall 109 for allowing a portion of the combustor air supply entry into the intake sections 103. As illustrated, these openings may be configured as impingement ports 41 formed through the annulus wall 109. Thus, according to preferred embodiments, the upstream port of the intake sections 103 of the first and second coolant flowpaths 101a,b may include multiple impingement ports 41 formed through the inboard and outboard annulus wall 109a,b, respectively. As will be appreciated, such impingement ports 41 may be configured for impinging airflow from the compressor discharge cavity 44 and training the resulting air jet against the cold side of the inboard and outboard flowpath wall 108a,b, thereby actively cooling it during operation. As will be appreciated, the openings of the upstream ports may be configured for metering the portion of the combustor air supply that is directed toward the one or more staged injectors 51. This apportioning may be made relative to a remaining portion of the combustor air supply that is otherwise directed toward the forward injector 21. According to certain embodiments, the metering of the combustor air supply includes directing at least 20% of it to the staged injectors 51. According to other preferred embodiments, at least 40% of the combustor air supply is directed to the staged injectors 51.

According to an alternative embodiment, as illustrated in FIG. 21, one or more surface ports 118 may be formed through an outer surface of the airfoil 113 of the stator blade 17. In such cases, connector channels 119 may be provided that branch from the cooling circuits 104 and fluidly couple the surface ports to one of them. As will be understood, this may be done to provide surface cooling to the airfoil 113 (i.e., film cooling), as well as convective cooling via the connector channels 119, which may configured to extend through internal regions of the airfoil 113 not covered by the cooling circuit 104.

According to preferred embodiments, the impingement ports 41 are not included in the outtake section 105 of the coolant flowpaths 101. Specifically, the annulus wall 109 may be configured to fluidly shield or isolate the outtake sections 105 of the coolant flowpath 101 from any flows that are exterior to it (for example, the flow of compressed air within the compressor discharge cavity 44). As will be appreciated, this may be done so that the supply of air to the outtake section 105 is first forced through the intake section 103 and the cooling circuit 104 of the coolant flowpaths 101a,b. Accordingly, the outboard annulus wall 109b corresponding to the outtake section 105 of the first coolant flowpath 101a may include separating structure (i.e., constructed as a solid wall) that fluidly isolates flow moving through it from flow in compressor discharge cavity 44. Likewise, the inboard annulus wall 109a corresponding to the outtake section 105 of the second coolant flowpath 101b may include separating structure that fluidly isolates flow moving through it from flow in the compressor discharge cavity 44.

As illustrated in FIG. 22, the staged injection system 50 may include more than one staged injector 51. These may be located in the combustor 13, or, as illustrated, the multiple staged injectors 51 may include a first and second staged injector 51 that reside in the turbine 12. In the latter case, the first staged injector 51 is formed through the outboard flowpath wall 108b and supplied air via the first coolant flowpath 101a, while the second staged injector 51 is formed through the inboard flowpath wall 108a and supplied air via the second coolant flowpath 101b. According to exemplary embodiments, the staged injectors 51 may include a nozzle 53 extending through or across the flow annulus 26, i.e., between the flow annulus wall 109 and the flowpath wall 108. In such cases, the downstream port of the outtake section 105 of the first coolant flowpath 101a may include an opening in the nozzle 53 of the first staged injector 51, while the downstream port of the outtake section 105 of the second coolant flowpath 101b may include an opening in the nozzle 53 of the second staged injector 51.

With reference again generally to FIGS. 16 through 22, the staged injector 51 may include any of type of conventional fuel/air injectors suitable for the functionality described herein. According to certain preferred embodiments, the staged injector 51 may be one that includes a mixing chamber 62 that resides exterior to the flow annulus 26. An example of this type of injector is shown in FIG. 12.

Alternatively, the staged injector 51 may be an immersed type of injector, as illustrated in FIG. 13. In this case, the nozzle 53 juts into the working fluid flowpath 37 from the flowpath wall 108. According to other embodiments, the staged injector 51 may include a nozzle 53 having an injection port 61 that resides flush with the hot side of the flowpath wall 108. An example of this type of injector is shown in FIG. 11. More generally, the staged injector 51 may include a nozzle 53 that includes multiple fuel ports 56. A fuel passageway 52 may be included that connects the fuel ports 56 to a fuel source positioned near the forward end of the combustor 13. As already discussed, the fuel passageway 52 may extend axially through an interior of the flowpath wall 108. As illustrated in FIG. 20, the fuel passageway 52 also may be formed outside of the flowpath wall 108.

The staged injector 51 of the present embodiments may be positioned along a range of locations within the working fluid flowpath 37. These positions may include any of the locations already discussed herein, including related to FIGS. 2 through 15. According to certain preferred embodiments, the staged injector 51 may be axially spaced forward a predetermined distance relative to the stator blade 17. The predetermined distance that the staged injector 51 is spaced forward relative to the stator blade 17 may be based on a residence criteria concerning a minimum time the fuel injected by the staged injector 51 preferably resides in the working fluid flowpath 37 before reaching the stator blade 17 during an anticipated operating condition. When the staged injector 51 resides within the turbine 12, it may be formed through one or both of the inboard sidewall and the outboard sidewall of the stator blade 17. As will be appreciated, in such cases, the inboard sidewall and the outboard sidewall may be integrally formed components with the airfoil 113. To attain the necessary forward spacing of the staged injector 51 relative to the stator blade 17, the sidewall that the injector is formed through may be elongated in the forward direction. According to certain embodiments, the elongated sidewalls of the stator blades 17 may extend to the interface between the combustor 13 and the turbine 12. As illustrated in FIG. 20, the staged injector 51 also may be integrated into the aft frame 20. When the staged injector 51 is positioned within the combustor 13, certain preferred embodiments include locating it approximately midway between the mid reference plane and the aftward reference plane.

As will be appreciated, one advantageous aspect of the presently discussed embodiments is that the significant portion of the airflow needed to cool the forward most row of stator blades 17 no longer bypasses combustion. This airflow, which typically is considerable, is usually circulated through the stator blades 17 and then vented into the flow of hot gases through the working fluid flowpath 37, thereby diluting it. This negatively impacts the performance of the engine. As will be appreciated, if this airflow can be reduced or replaced via use as an input to the staged injector 51, then the gas turbine 10 may maintain output and efficiency, while allowing the combustor 13 to run at lower temperatures that produce less NOx. Further, since this also may allow the engine to generally run cooler at the same load levels, less expensive materials may be used in its construction. Additionally, as will be appreciated, the systems associated with FIGS. 16 through 22 also enable the same advantages with regard to reducing overall system pressure losses, as discussed above in relation the embodiments of FIGS. 7 through 15.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:
1. A gas turbine that comprises:
a combustor coupled to a turbine that together define a working fluid flowpath, the working fluid flowpath extending aftward along a longitudinal axis from a forward end defined by a forward injector in the combustor, through an interface at which the combustor connects to the turbine, and then through the turbine to an aftward end defined therein;
a compressor discharge cavity formed about the working fluid flowpath for receiving a combustor air supply delivered thereto by a compressor;
a staged injection system that includes the forward injector and, axially spaced aftward therefrom along the longitudinal axis of the working fluid flowpath, a staged injector;
a stator blade positioned within a row of circumferentially spaced stator blades in the turbine, the stator blade comprising an airfoil extending across the working fluid flowpath between an inboard sidewall and an outboard sidewall;
fuel directing structure configured to apportion a combustor fuel supply between the forward injector and the staged injector; and
air directing structure for apportioning the combustor air supply between the forward injector and the staged injector;
wherein the air directing structure includes a one-way continuous coolant flowpath, the coolant flowpath comprising:
an intake section that comprises an upstream port that is fluidly coupled to the compressor discharge cavity and a downstream port that is formed through one of the inboard sidewall and the outboard sidewall;
an outtake section that comprises a downstream port that is fluidly coupled to the staged injector and an upstream port formed through whichever of the inboard sidewall and the outboard sidewall is the opposite of the one that the downstream port of the intake section is formed through; and
a cooling circuit extending through an interior of the airfoil of the stator blade, wherein the cooling circuit comprises an upstream end that connects to the downstream port of the intake section and a downstream end that connects to the upstream port of the outtake section;
further comprising:

a flow annulus surrounding the working fluid flowpath, wherein the staged injector intersects the flow annulus so to attain an injection point within the working fluid flowpath, and wherein, relative an axial position of the injection point, a forward annulus section is defined to a forward side of the injection point, and an aftward annulus section is defined to an aftward side of the injection point; and an axial partition positioned in the flow annulus so to axially coincide with the staged injector, the axial partition being configured for fluidly sealing the forward annulus section from the aftward annulus section such that:

substantially all of the air of the combustor air supply flowing into the forward annulus section is directed to the forward injector; and substantially all of the air of the combustor air supply flowing into the aftward annulus section is directed to the staged injector.

2. The gas turbine according to claim 1, wherein:
the row of stator blades comprises a forward most row of stator blades in the turbine; and
the intake section and the outtake section of the coolant flowpath comprise axial sections of the flow annulus residing to each side of the inboard sidewall and the outboard sidewall.

3. The gas turbine according to claim 2, wherein:
the intake section and the outtake section of the coolant flowpath are positioned so that each axially overlaps an axial range defined between a leading edge and a trailing edge of the stator blade; and
the downstream port of the intake section is formed through the outboard sidewall and the upstream port of the outtake section is formed through the inboard sidewall.

4. The gas turbine according to claim 2, wherein:
the intake section and the outtake section of the coolant flowpath are positioned so that each axially overlaps an axial range defined between a leading edge and a trailing edge of the stator blade; and
the downstream port of the intake section is formed through the inboard sidewall and the upstream port of the outtake section is formed through the outboard sidewall.

5. The gas turbine according to claim 1, wherein a flowpath wall defines the working fluid flowpath, the flowpath wall having a hot side, which faces the working fluid flowpath, and, opposite the hot side, a cold side, which faces the flow annulus; and
wherein an annulus wall surrounds and is offset from the flowpath wall so to form the flow annulus therebetween, the annulus wall having a hot side, which faces the flow annulus, and a cold side, which fluidly communicates with the compressor discharge cavity.

6. The gas turbine according to claim 5, wherein the upstream port of the intake section of the coolant flowpath comprises openings formed through a corresponding section of the annulus wall for allowing a portion of the combustor air supply entry into the intake section; and
wherein the openings are configured for metering the portion of the combustor air supply flowing to the staged injector relative a remaining portion of the combustor air supply flowing to the forward injector.

7. The gas turbine according to claim 6, wherein the openings formed through the annulus wall comprises impingement ports configured for cooling the cold side of the flowpath wall.

8. The gas turbine according to claim 6, wherein the metering the combustor air supply includes directing at least 30% of the combustor air supply to the staged injector.

9. The gas turbine according to claim 6, wherein the metering the combustor air supply includes directing at least 50% of the combustor air supply to the staged injector.

10. The gas turbine according to claim 5, wherein:
within the turbine:
the flowpath wall comprises an inboard flowpath wall that defines an inboard boundary of the working fluid flowpath and an outboard flowpath wall that defines an outboard boundary of the working fluid flowpath; and
the flow annulus comprises an inboard flow annulus and an outboard flow annulus, and the annulus wall comprises an inboard annulus wall and an outboard annulus wall, wherein the inboard sidewall and the outboard sidewall comprise, respectively, axial sections of the inboard flowpath wall and the outboard flowpath wall;
the inboard annulus wall is offset from the inboard flowpath wall so to form the inboard flow annulus therebetween; and
the outboard annulus wall is offset from the outboard flowpath wall so to form the outboard flow annulus therebetween; and
within the combustor:
the flowpath wall comprises an inner radially wall; and
the annulus wall comprises an outer radial wall formed about the inner radial wall, the inner radial wall and the outer radial wall concentrically arranged about the longitudinal axis of the working fluid flowpath.

11. The gas turbine according to claim 8, wherein the intake section and the outtake section are positioned so to axially overlap each other; and
wherein both the intake section and the outtake section of the coolant flowpath are configured so to define an axial range that wholly includes therein an axial range defined between a leading edge and a trailing edge of the stator blade.

12. The gas turbine according to claim 9, wherein:
the intake section of the coolant flowpath comprises an axial section of the inboard flow annulus;
the outtake section of the coolant flowpath comprises an axial section of the outboard flow annulus.

13. The gas turbine according to claim 9, wherein:
the intake section of the coolant flowpath comprises an axial section of the outboard flow annulus; and
wherein the outtake section of the coolant flowpath comprises an axial section of the inboard flow annulus.

14. The gas turbine according to claim 9, wherein the staged injector is positioned within the combustor, the staged injector being formed through the inner radial wall for enabling injection of a fuel and air mixture into the working fluid flowpath.

15. The gas turbine according to claim 9, wherein the staged injector is positioned within the turbine.

16. The gas turbine according to claim 9, wherein the staged injector comprises a nozzle extending through the flow annulus between the flow annulus wall and the flowpath wall, and the downstream port of the outtake section of the coolant flowpath comprises an opening in the nozzle; and wherein the outboard annulus wall corresponding to the outtake section of the coolant flowpath comprises separating structure that fluidly isolates flow therethrough from flow in the compressor discharge cavity.

17. The gas turbine according to claim 9, wherein the staged injector includes a nozzle; and wherein the fuel directing structure comprises one or more fuel ports formed within the nozzle and a fuel passageway formed outboard of the inner radial wall that connects to the one or more fuel ports.

18. The gas turbine according to claim 17, wherein the nozzle comprises a tube and the one or more fuel ports are laterally positioned between an outboard end and an inboard end of the tube; and wherein the fuel passageway extends axially through an interior of the outer radial wall, the fuel passageway comprising a connection between a fuel source positioned near the forward end of the combustor and the one or more fuel ports.

19. The gas turbine according to claim 9, further comprising:

surface ports formed through an outer surface of the airfoil of the stator blade; and connector channels branching from the cooling circuit that fluidly coupling the surface ports to the coolant flowpath.

* * * * *